(12) United States Patent
Choi et al.

(10) Patent No.: US 10,275,943 B2
(45) Date of Patent: Apr. 30, 2019

(54) PROVIDING REAL-TIME SENSOR BASED INFORMATION VIA AN AUGMENTED REALITY APPLICATION

(71) Applicant: Verizon Patent and Licensing Inc., Arlington, VA (US)

(72) Inventors: Christopher Samuel Choi, New York, NY (US); Myles Coolen, Barrie (CA); Mitchell Edward Dull, Amityville, NY (US); Harsha Viswanathan, New York, NY (US); Christian Guirnalda, New Brunswick, NJ (US); Jaskeerat Bedi, New York, NY (US); Mrinalini Ingram, Morristown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 9 days.

(21) Appl. No.: 15/377,292

(22) Filed: Dec. 13, 2016

(65) Prior Publication Data

US 2018/0165882 A1    Jun. 14, 2018

(51) Int. Cl.
*G06T 19/00* (2011.01)
*H04W 4/02* (2018.01)
*H04L 29/06* (2006.01)

(52) U.S. Cl.
CPC .......... *G06T 19/006* (2013.01); *G06T 19/003* (2013.01); *H04L 67/38* (2013.01); *H04W 4/02* (2013.01)

(58) Field of Classification Search
CPC .................................................. G06T 19/006

USPC ......................................................... 345/633
See application file for complete search history.

(56) References Cited

U.S. PATENT DOCUMENTS

| | | | | |
|---|---|---|---|---|
| 7,719,563 | B2* | 5/2010 | Richards | G06F 3/04815 348/36 |
| 8,681,178 | B1* | 3/2014 | Tseng | G06T 19/006 345/629 |
| 8,965,624 | B2* | 2/2015 | Hosein | G07C 5/006 701/29.1 |
| 9,256,711 | B2* | 2/2016 | Horseman | G06F 19/3418 |
| 2011/0249122 | A1* | 10/2011 | Tricoukes | G02B 27/017 348/158 |
| 2012/0105475 | A1* | 5/2012 | Tseng | G01C 21/3611 345/633 |
| 2013/0061148 | A1* | 3/2013 | Das | G06K 9/3258 715/738 |
| 2014/0152558 | A1* | 6/2014 | Salter | G06F 3/013 345/157 |
| 2014/0176603 | A1* | 6/2014 | Kumar | G06T 11/60 345/633 |

(Continued)

*Primary Examiner* — Javid A Amini

(57) ABSTRACT

A device may receive, from a user device, information that identifies a geolocation of the user device. The device may determine a set of sensor devices that are associated with the geolocation. The device may request, from the set of sensor devices, real-time information associated with the geolocation based on determining the set of sensor devices. The device may receive, from the set of sensor devices, the real-time information associated with the geolocation based on requesting the real-time information. The device may provide, to the user device, the real-time information associated with the geolocation to permit the user device to provide, for display, the real-time information as an augmented reality overlay.

20 Claims, 29 Drawing Sheets

(56) References Cited

U.S. PATENT DOCUMENTS

| | | | | |
|---|---|---|---|---|
| 2015/0029220 A1* | 1/2015 | Hittel | ................... | G06T 19/006 |
| | | | | 345/633 |
| 2015/0302650 A1* | 10/2015 | Abdelmoati | ............ | G06F 3/041 |
| | | | | 345/633 |
| 2016/0124501 A1* | 5/2016 | Lam | ........................ | G06F 3/011 |
| | | | | 345/156 |
| 2016/0277863 A1* | 9/2016 | Cahill | .................... | H04R 3/005 |
| 2016/0292920 A1* | 10/2016 | Sprock | .................... | G06T 11/60 |
| 2016/0350868 A1* | 12/2016 | Votaw | .................... | G06Q 40/12 |
| 2016/0379414 A1* | 12/2016 | Brown | ................ | G06F 3/04842 |
| | | | | 345/633 |
| 2017/0053441 A1* | 2/2017 | Nadumane | .............. | H04L 67/06 |
| 2017/0085656 A1* | 3/2017 | Abbott | .................... | H04L 67/18 |
| 2017/0124764 A1* | 5/2017 | Akselrod | .............. | G06T 19/006 |
| 2017/0146801 A1* | 5/2017 | Stempora | ........... | G02B 27/0172 |
| 2017/0344114 A1* | 11/2017 | Osterhout | ............... | G06F 3/017 |
| 2017/0344828 A1* | 11/2017 | Akselrod | .............. | G06T 7/0004 |
| 2017/0352184 A1* | 12/2017 | Poulos | .............. | G02B 27/0172 |
| 2018/0005062 A1* | 1/2018 | Aguera-Arcas | .... | G06K 9/00993 |
| 2018/0035606 A1* | 2/2018 | Burdoucci | ........... | A01D 34/008 |
| 2018/0045967 A1* | 2/2018 | Osterhout | ............. | G02B 7/008 |

\* cited by examiner

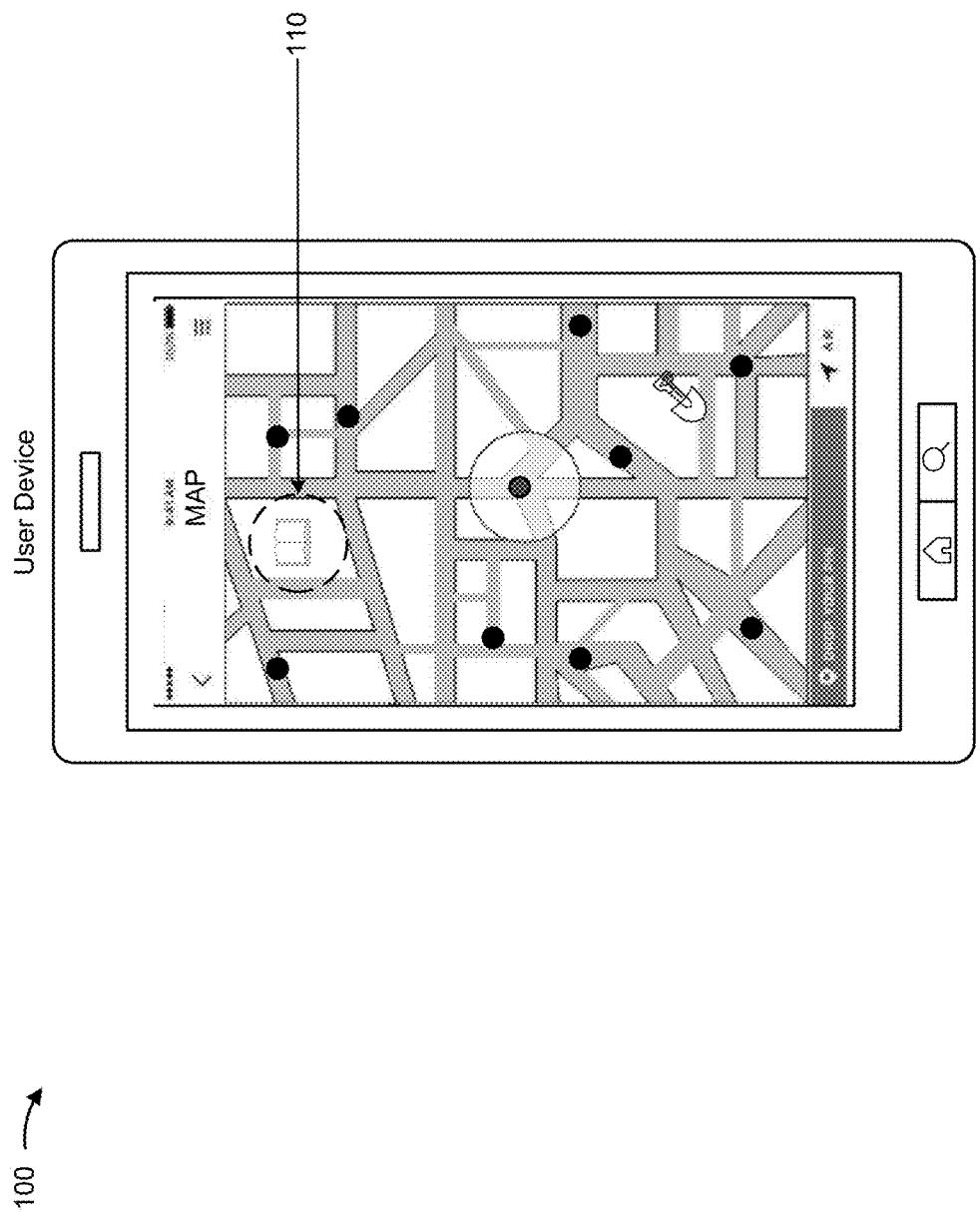

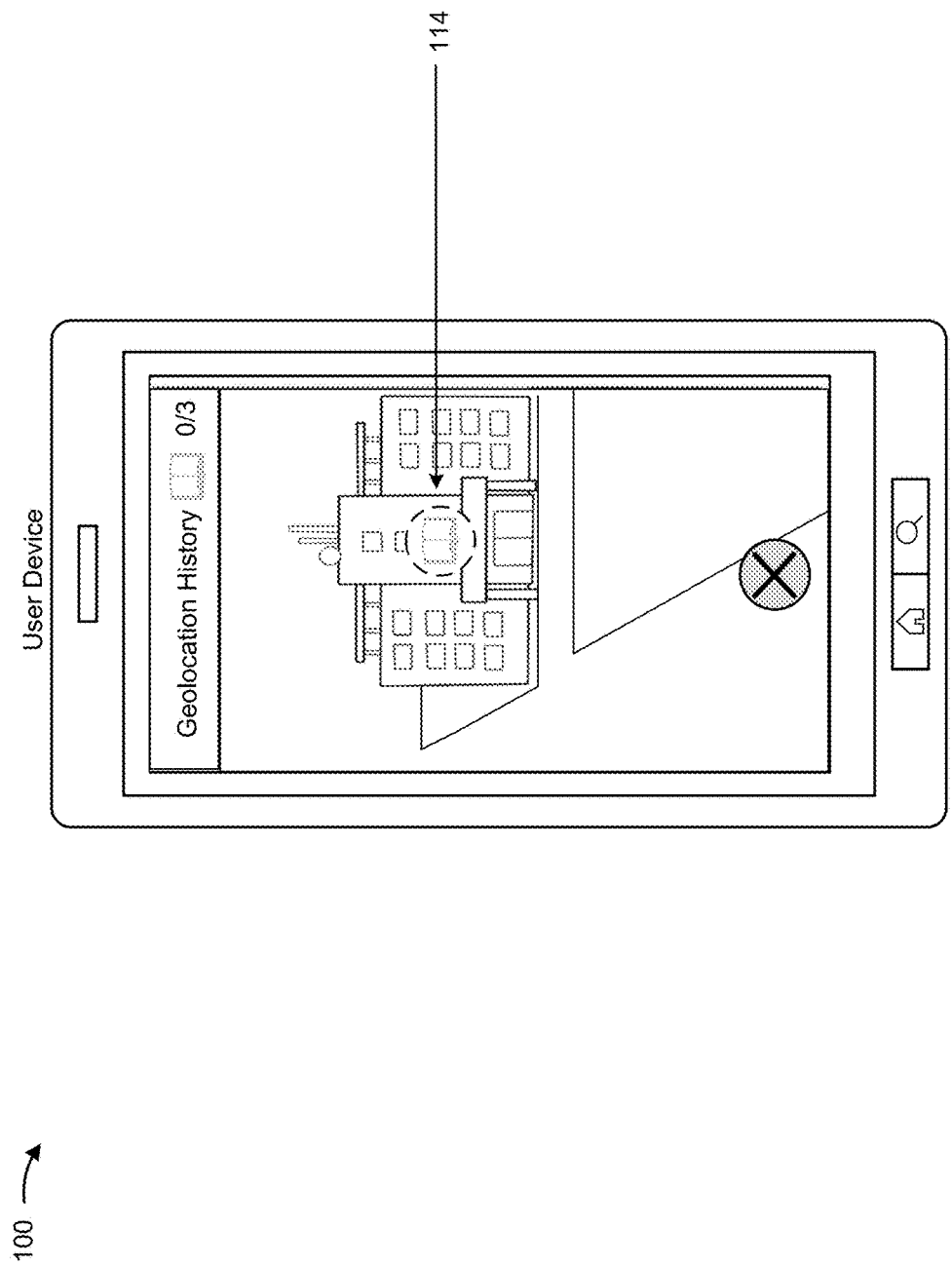

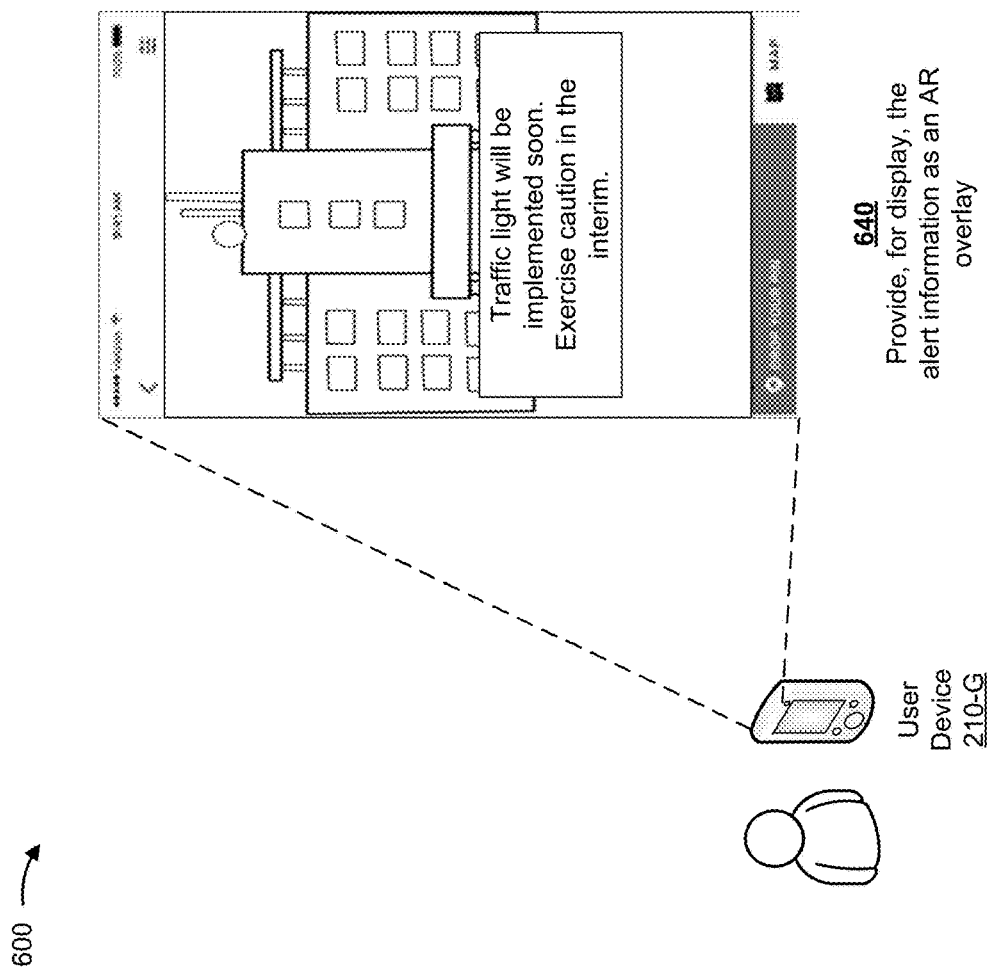

PROVIDING REAL-TIME SENSOR BASED INFORMATION VIA AN AUGMENTED REALITY APPLICATION

BACKGROUND

Augmented reality (AR) applications enable a user, utilizing a user device, to view a real-world environment that is augmented by computer-generated content, such as images, video, text, or the like. For example, the user device may provide, for display, a view of real-world surroundings of the user that may include superimposed content.

BRIEF DESCRIPTION OF THE DRAWINGS

FIGS. 6A-6E are diagrams of an example implementation relating to the example process shown in FIG. 5.

DETAILED DESCRIPTION OF PREFERRED EMBODIMENTS

The following detailed description of example implementations refers to the accompanying drawings. The same reference numbers in different drawings may identify the same or similar elements.

A user, such as an inhabitant or a visitor of a particular geolocation, may wish to ascertain information regarding the geolocation (e.g., a town, a city, or the like). For example, the user may wish to ascertain historical, current, and/or upcoming information associated with the geolocation as the user navigates throughout the geolocation (e.g., to become more familiar with the geolocation, to identify activities associated with the geolocation, etc.). Additionally, the user may wish to provide information to other users associated with the geolocation and/or users associated with an entity associated with the geolocation (e.g., a government agency, an emergency response department, an organization, a business, or the like). For example, the user may wish to initiate discourse regarding the geolocation (e.g., between other citizens of the geolocation and/or users associated with an entity), opine on an issue associated with the geolocation, or the like. Implementations described herein enable a user device, via an augmented reality (AR) application, to provide information for display that may enable the user to learn about and/or contribute to a community associated with the geolocation.

Implementations described herein enable a server device to aggregate information associated with a geolocation using information from multiple disparate data sources (e.g., external server devices, sensor devices associated with the Internet of things (IoT), user devices, etc.), and provide the information to a user device such as a smartphone, a headset such as an AR/virtual reality (VR) visor, user glasses, a tablet, or other devices. The user device may provide, for display via a user interface and an AR application, the information associated with the geolocation including AR overlays. In this way, the user may view real-time information as the user navigates the geolocation, interact with the user device to generate user generated content that may be viewed by other users, report feedback to an entity associated with the geolocation, and/or the like. Additionally, in this way, implementations described herein enable relevant content to be provided to the user device, thereby reducing a need of the user device to perform searches for particular information. For example, implementations described herein may reduce an amount of instances where the user causes the user device to perform a search for particular information, such as information associated with the geolocation, events of the geolocation, etc. In this way, implementations described herein conserve processor and/or memory resources of the user device and/or conserve network resources by reducing an amount of searches performed by the user device.

Figure 1A:
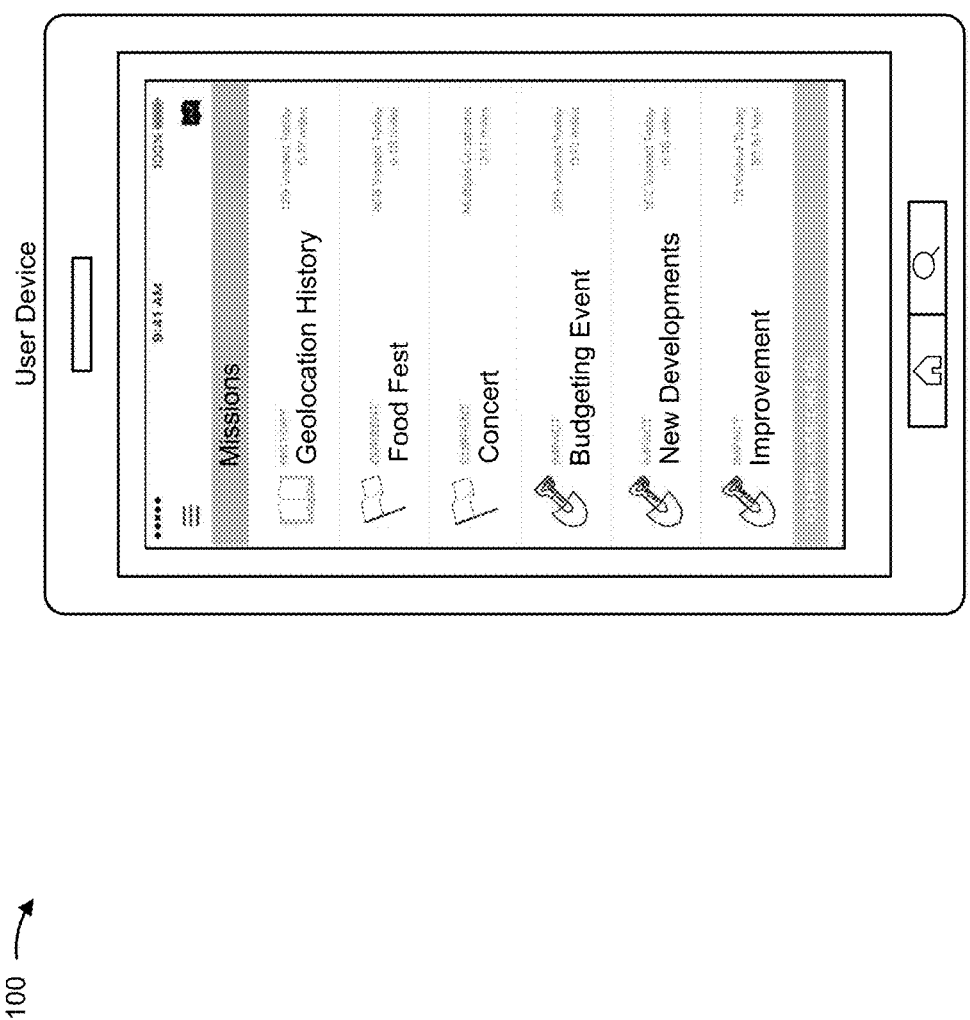
FIGS. 1A-1T are diagrams of an overview of an example implementation described herein.
Figure 1B:
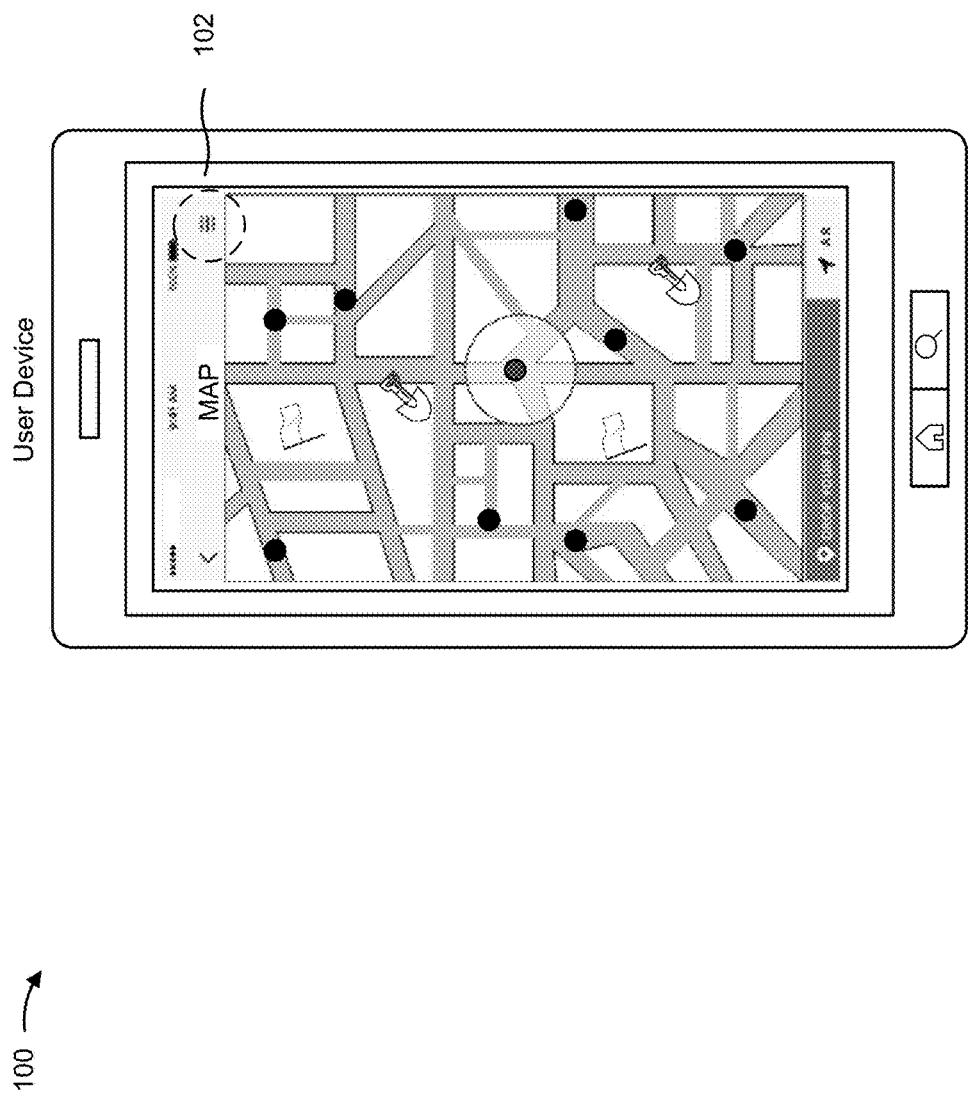
Figure 1C:
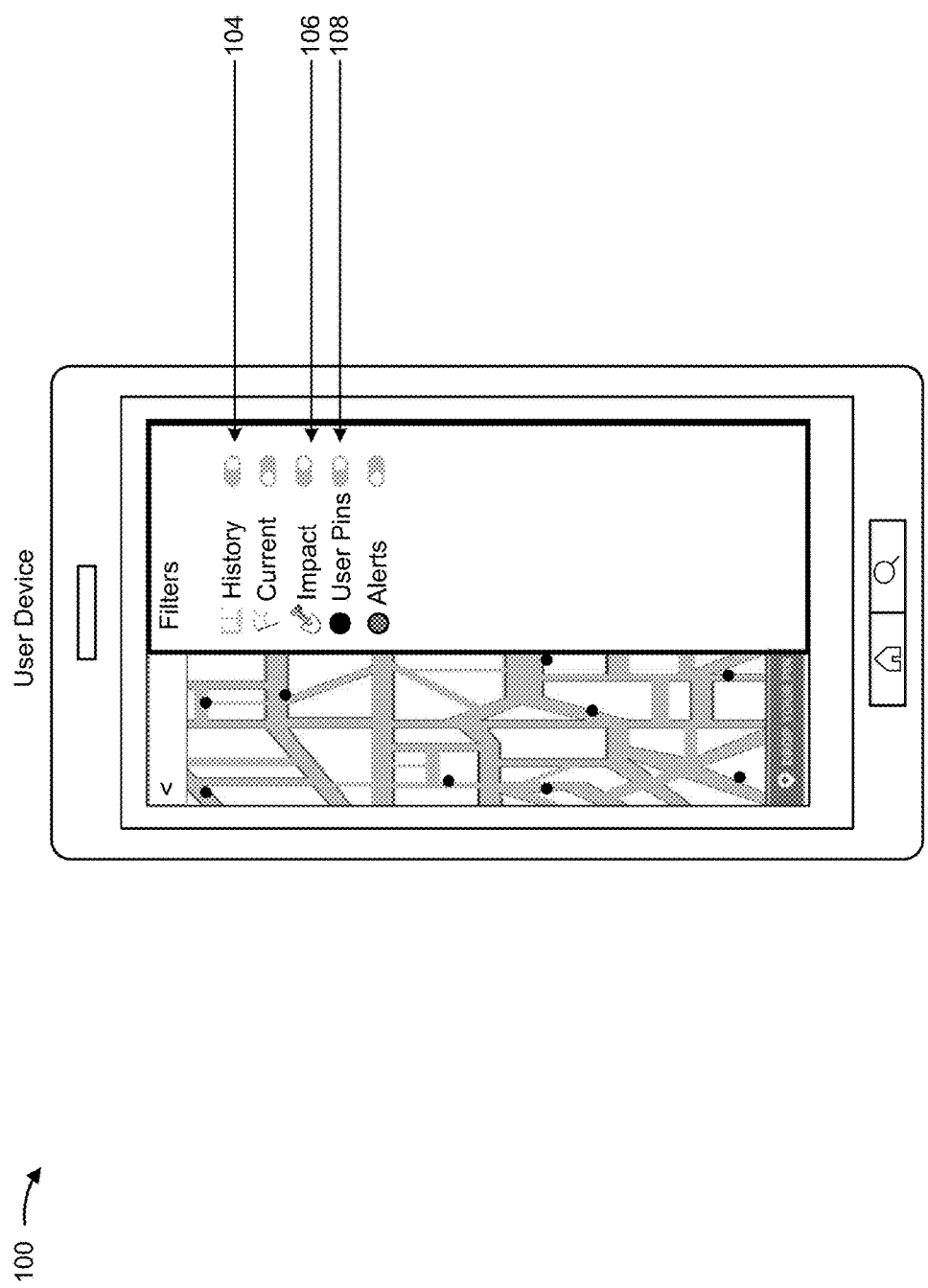
Figure 1E:
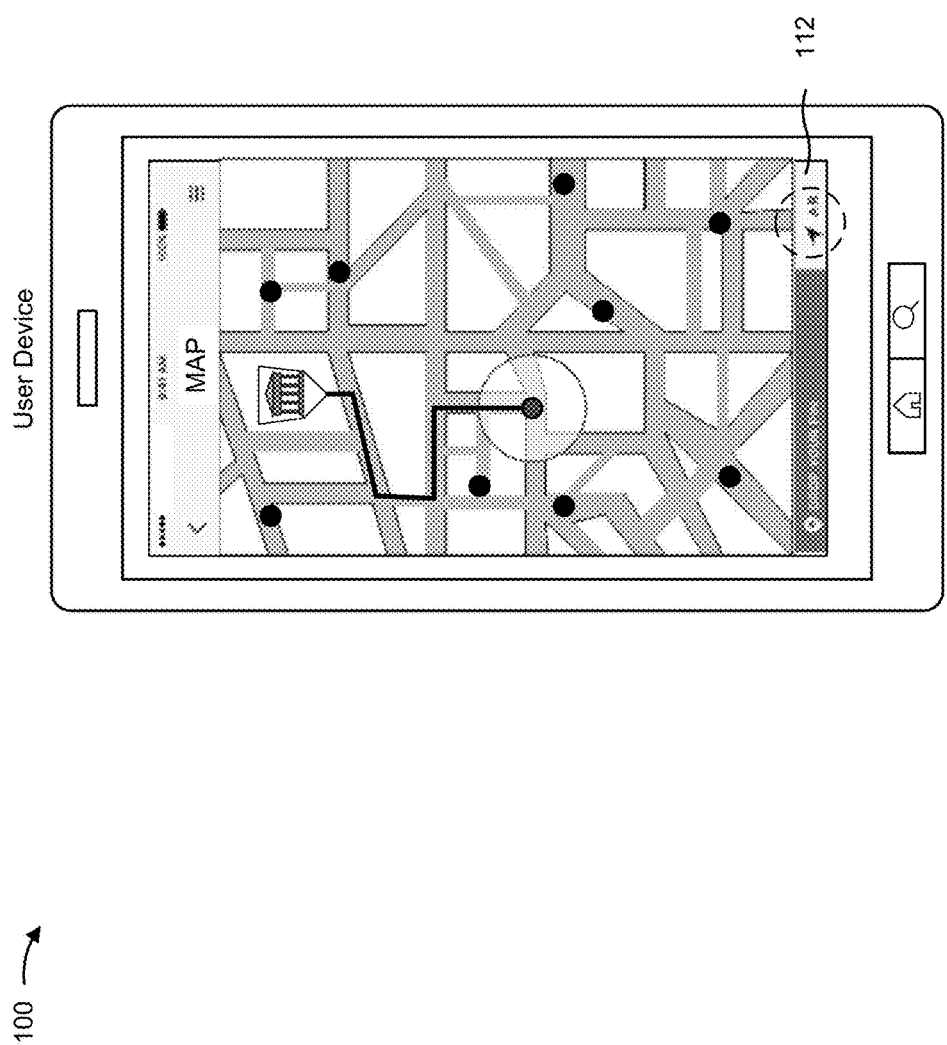
Figure 1F:
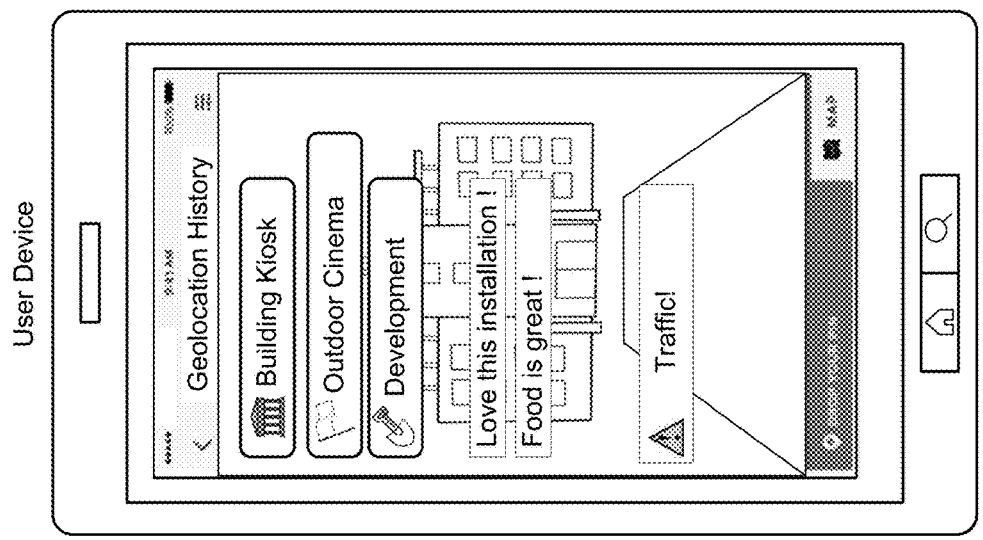
Figure 1G:
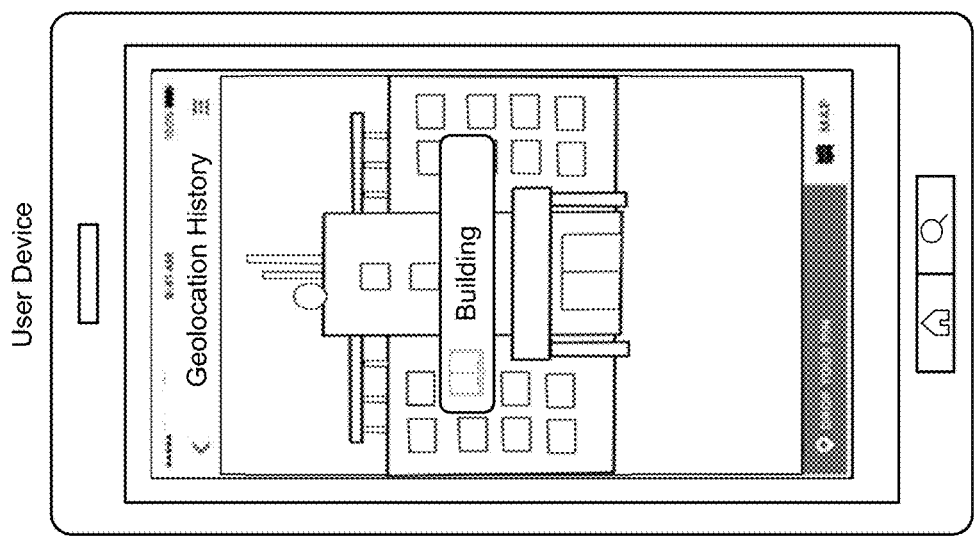
Figure 1H:
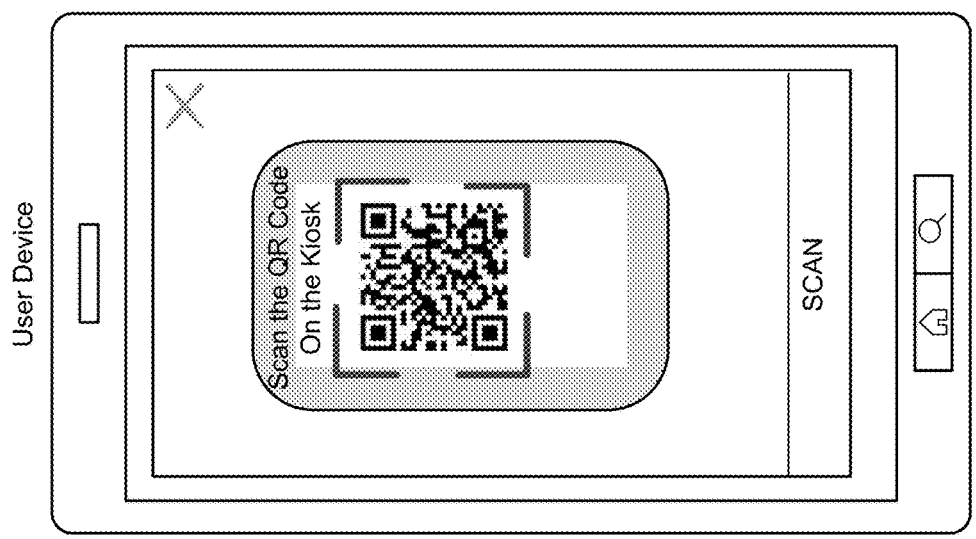
Figure 1J:
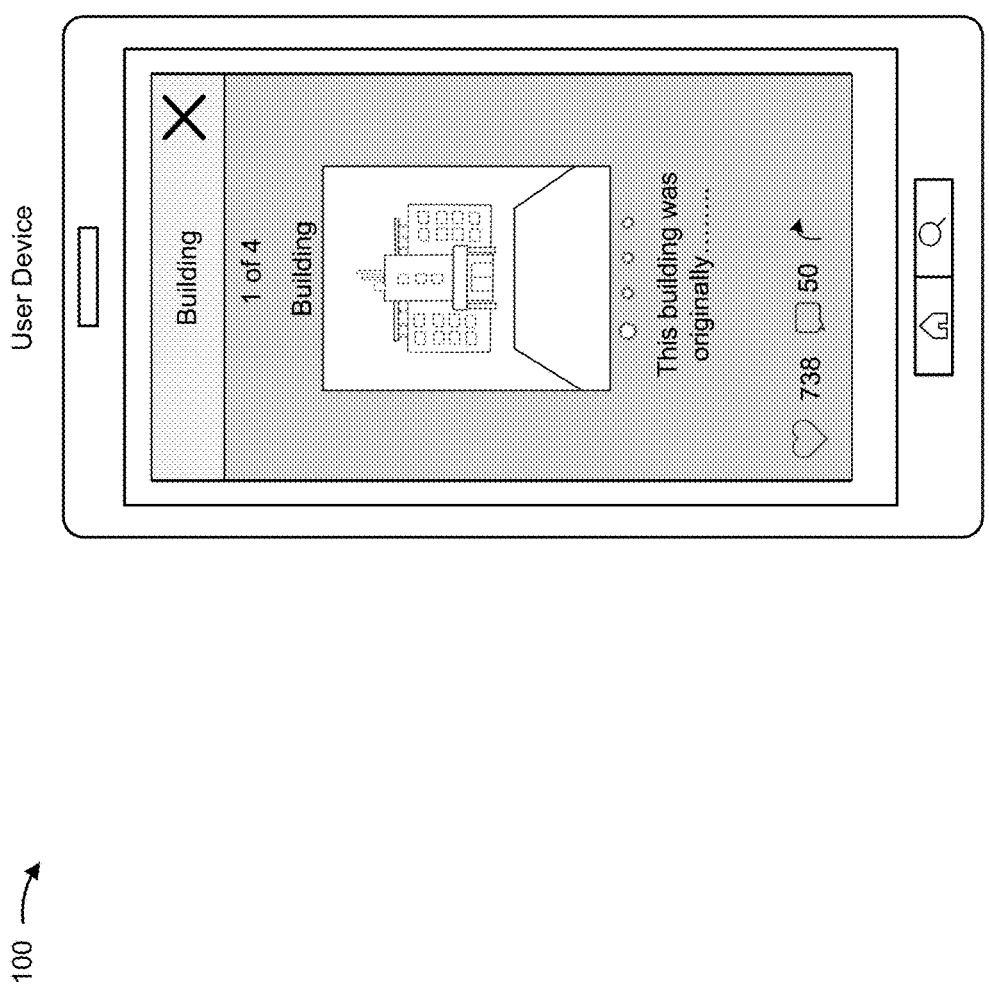
Figure 1K:
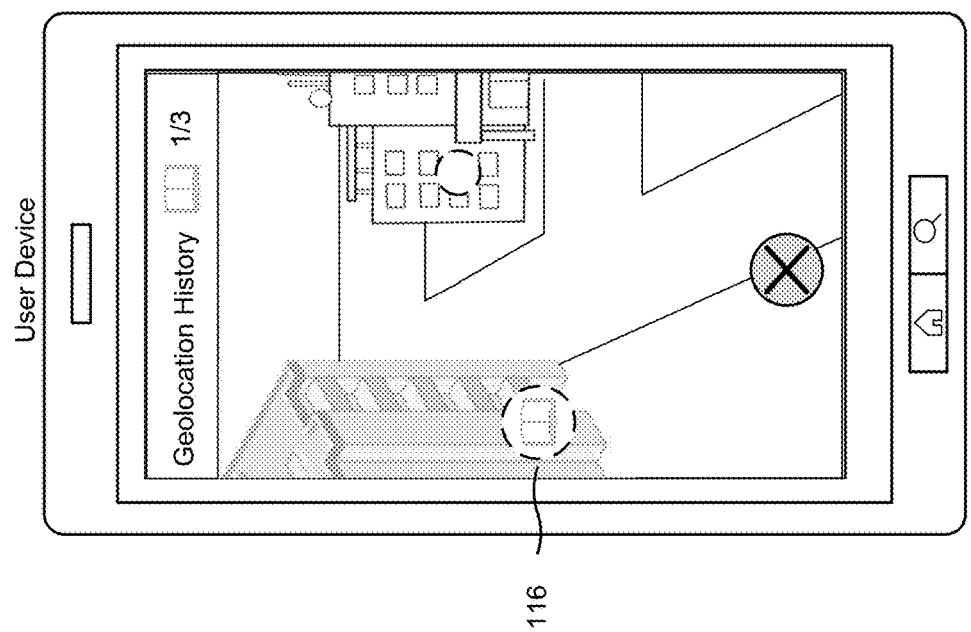
Figure 1L:
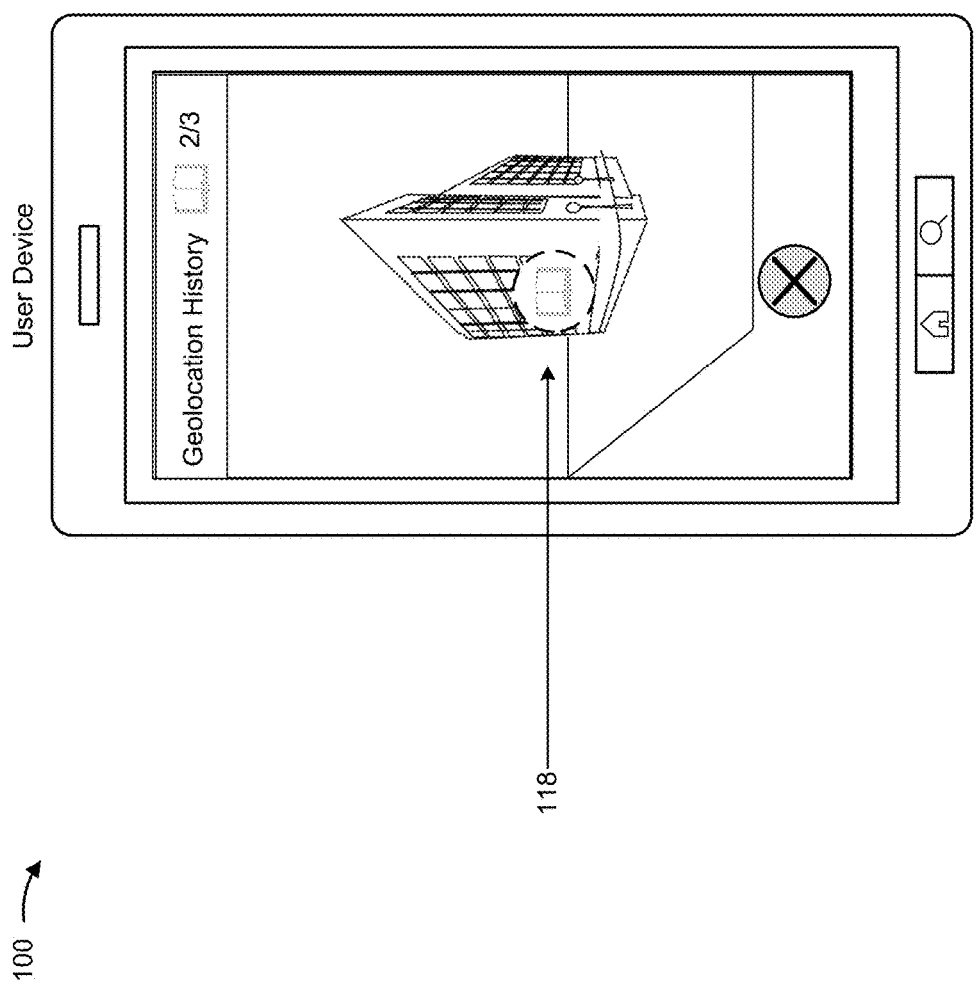
Figure 1M:
Figure 1N:
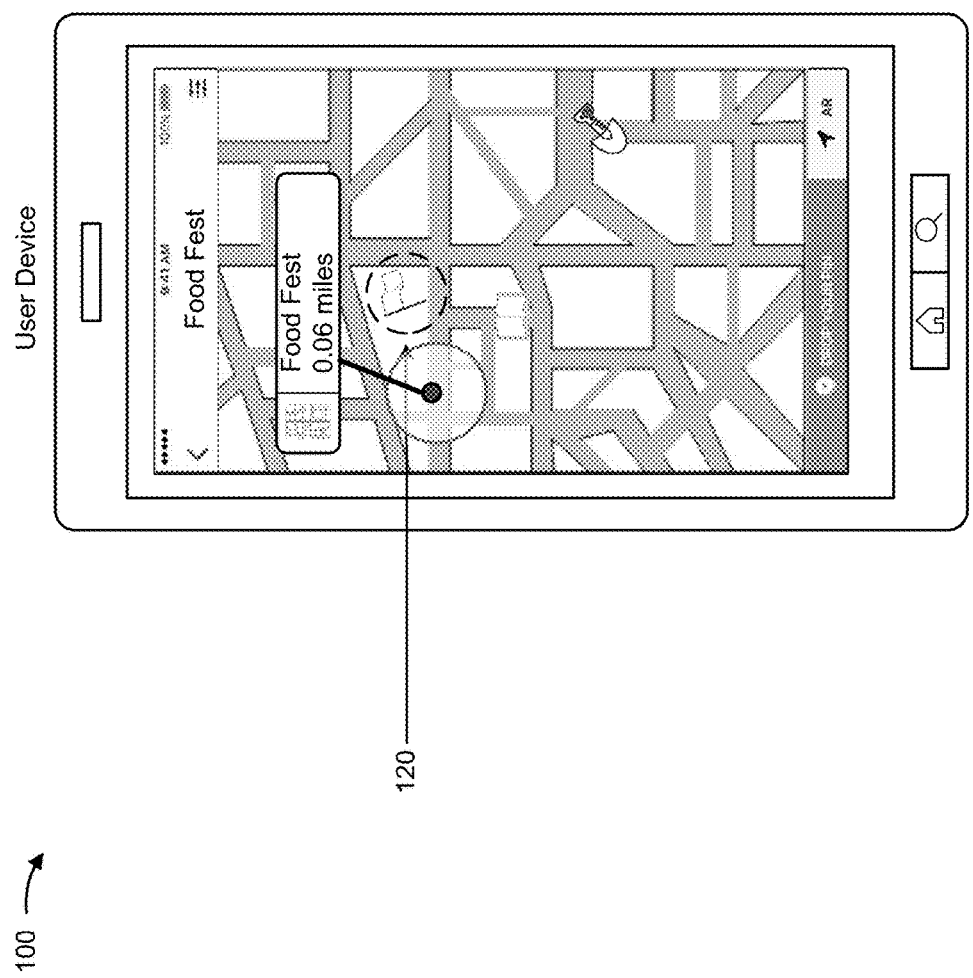
Figure 10:
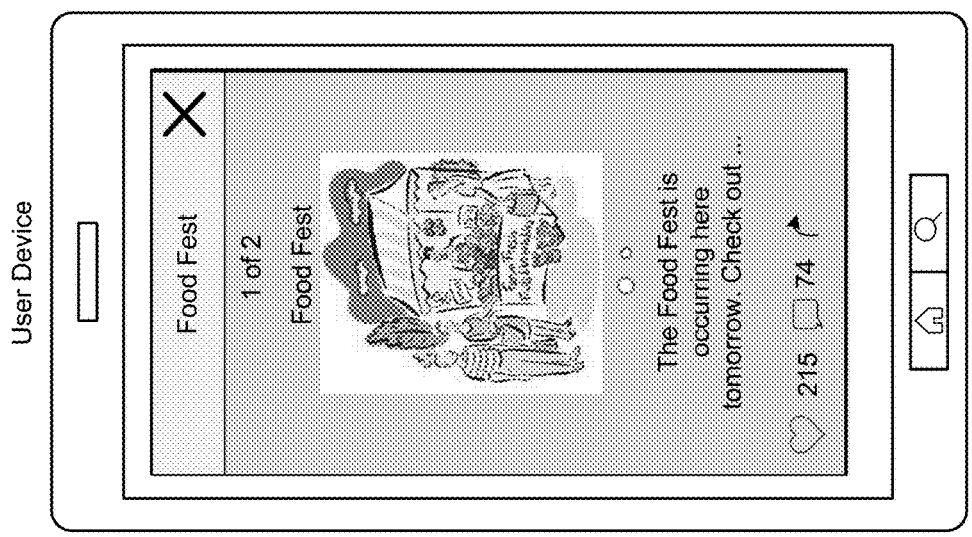
Figure 1P:
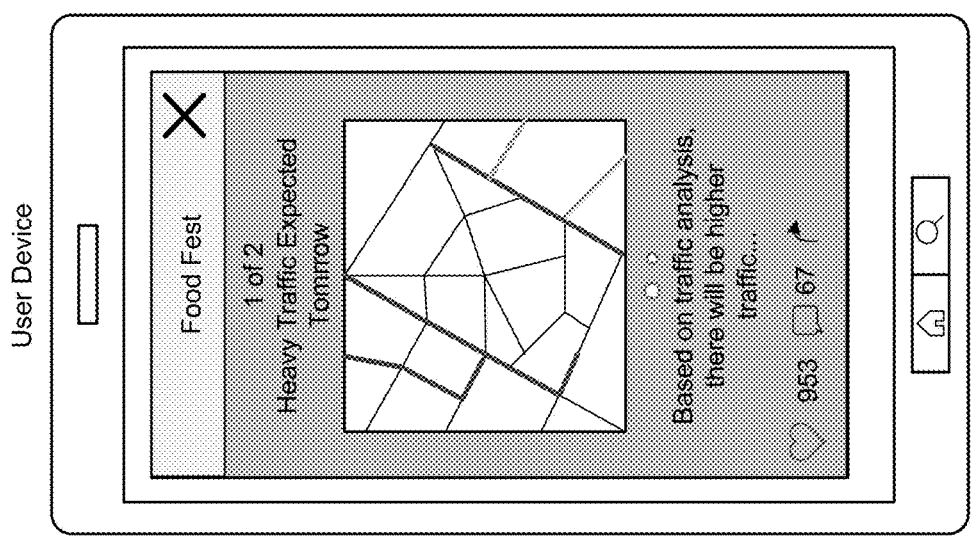
Figure 1Q:
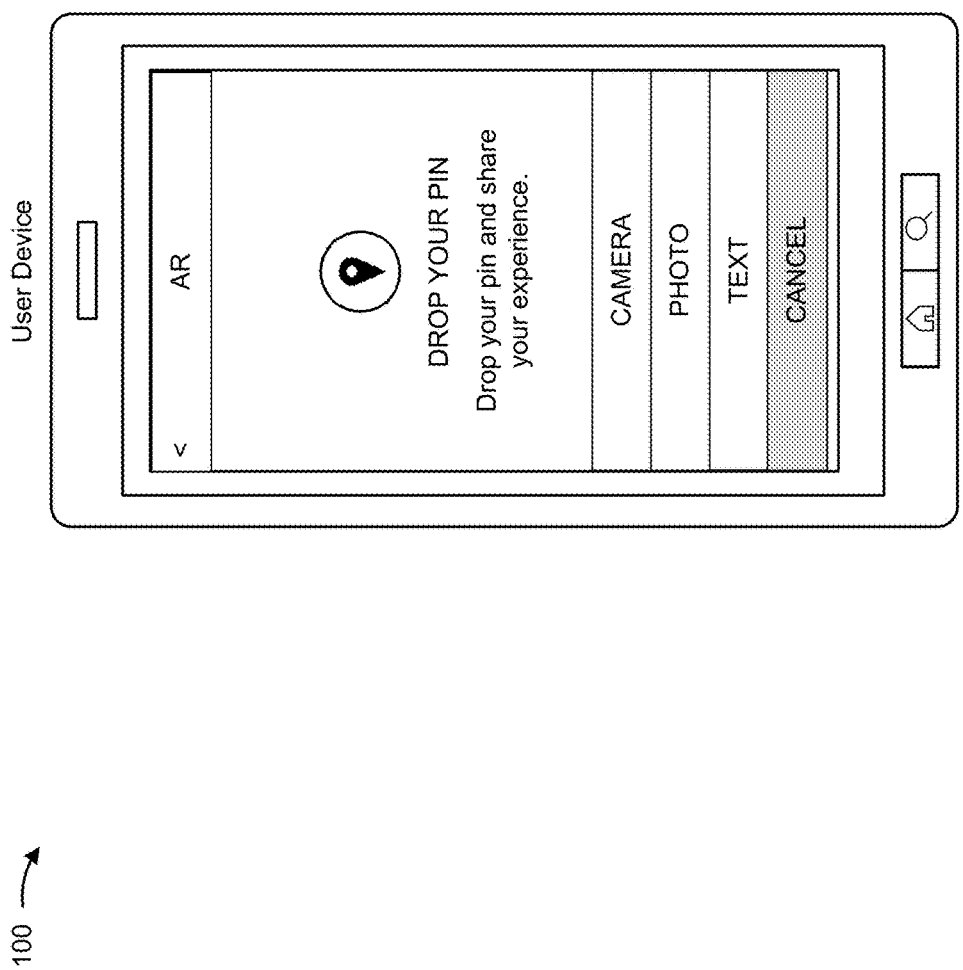
Figure 1R:
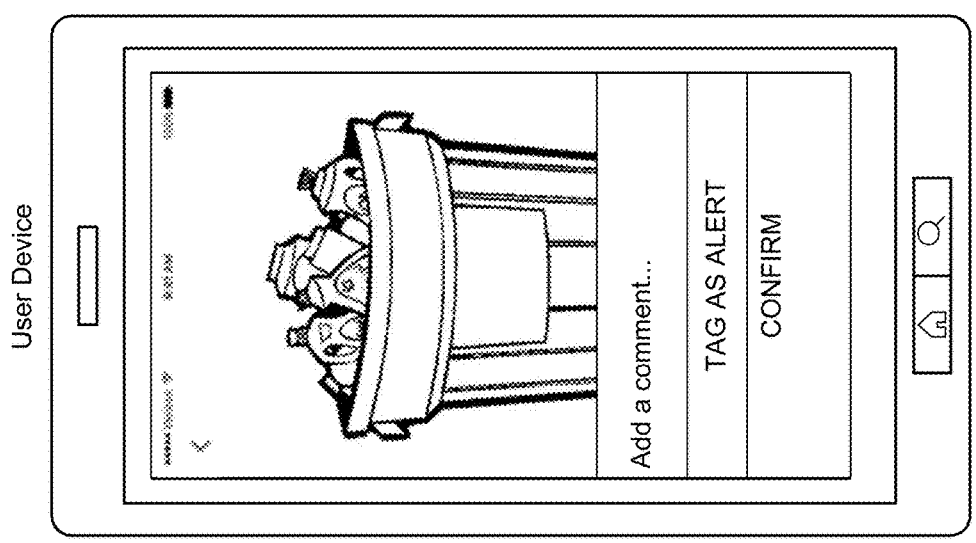
Figure 1S:
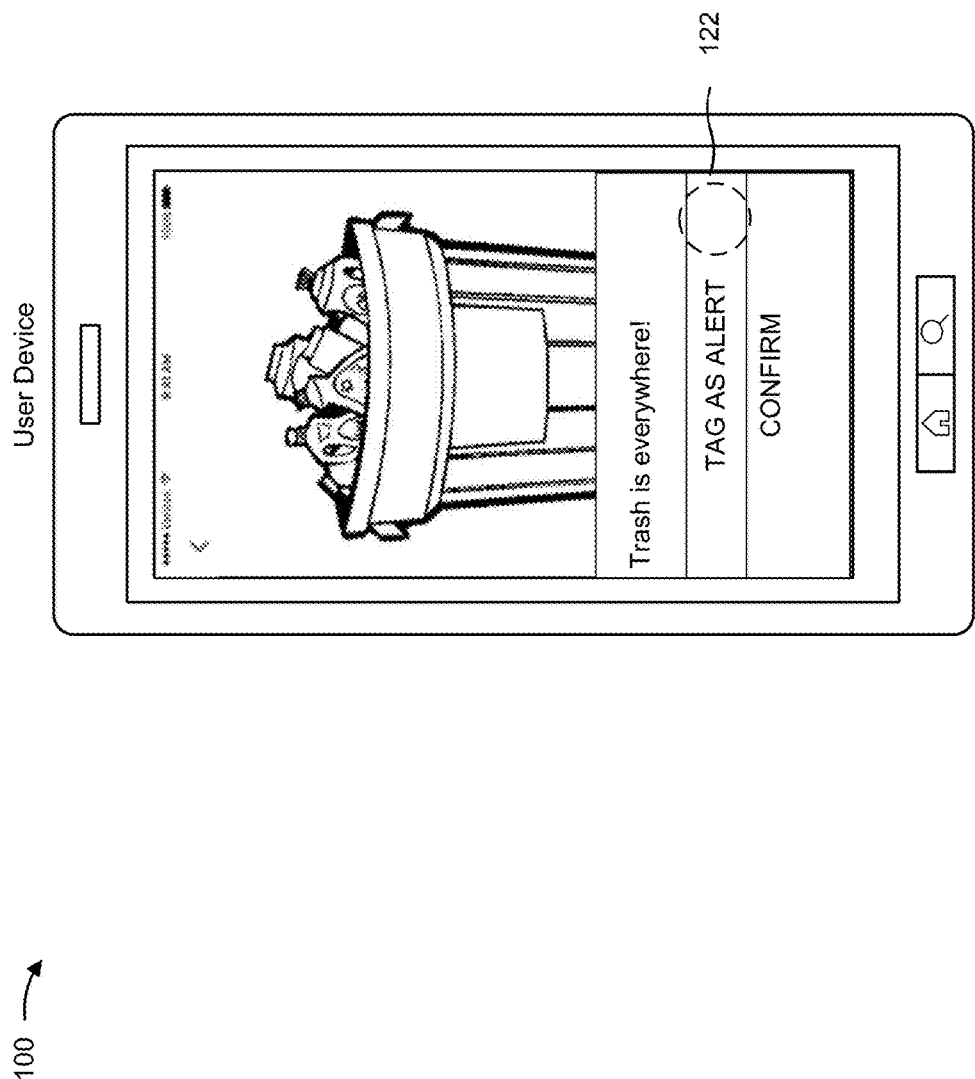
Figure 1T:
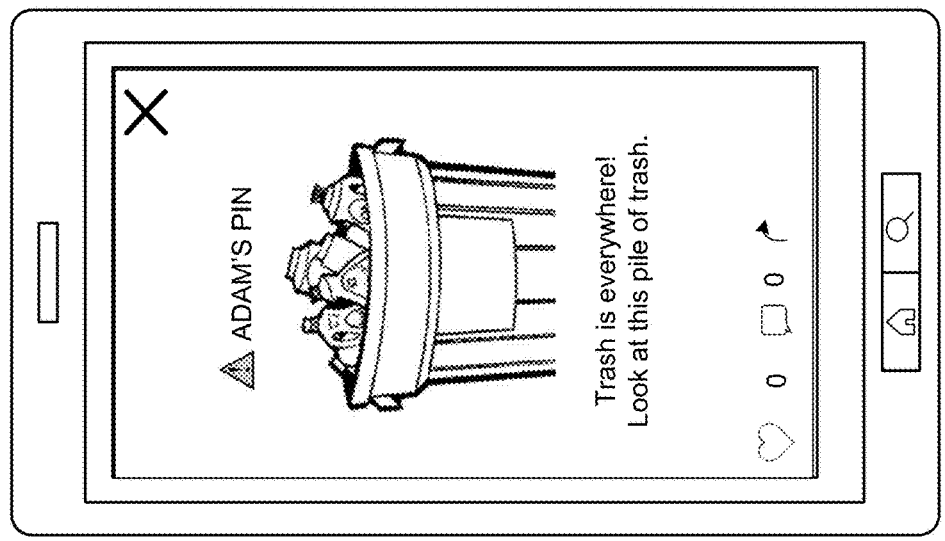

FIGS. 1A-1T are diagrams of an overview of an example implementation 100 described herein. As shown in FIG. 1A, a user device may provide information, for display, based on executing an application (e.g., a citizen engagement application). For example, the application may include a geolocation based AR application for discovering and/or reporting information associated with a geolocation. As shown, the user device may provide, for display, information associated with multiple missions based on a geolocation of the user device. A mission may include a curated and/or geolocation based user experience that involves augmented reality, IoT data, and/or other accessible data associated with a geolocation. As an example, a mission may include a set of actions to be performed by a user of the user device in association with a geolocation. In some implementations, an engagement platform (e.g., a cloud server device) may provide, to the user device, information associated with particular missions based on a geolocation of the user device. As examples, a "history" mission may encourage the user to discover historical information associated with the geolocation, a "current" mission may encourage the user to discover current events and/or conversations associated with the geolocation, and an "impact" mission may encourage the user to provide input and/or feedback regarding the geolocation.

In some implementations, the engagement platform may provide, to the user device, information associated with particular missions based on information associated with the user (e.g., curated missions based on user preferences, completed missions, friend activity, etc.). Additionally, or alternatively, the engagement platform may provide, to the user device, information associated with particular missions based on popularities of the missions determined, for example, by an amount of users that have completed the missions, rankings of the missions determined by user feedback, particular entities associated with the missions, or the like.

As shown in FIG. 1B, the user device may provide, for display, a map view of the geolocation that includes user interface elements that identify particular missions. Additionally, as shown, the user device may provide, for display, a current location of the user. As shown by reference number 102, assume that the user interacts (e.g., performs a touch gesture, such as a tap) with a user interface element associated with a menu.

As shown in FIG. 1C, the user device may provide, for display, a menu that enables the user to select particular missions and/or information to be provided for display. As shown by reference numbers 104, 106, and 108 respectively, assume that the user selects "history" missions, "impact" missions, and "user pins" information to be provided for display.

As shown in FIG. 1D, the user device may provide, for display, the map view of the location that includes user interface elements that correspond to the selected missions and/or information, and includes the current location of the user. As shown by reference number 110, assume that the user interacts with a particular user interface element associated with a particular "history" mission.

As shown in FIG. 1E, the user device may provide, for display, the map view that includes a route associated with the selected mission and the current location of the user. Additionally, as shown, the user device may prevent information associated with other missions from being provided for display based on the user selection of the particular mission. As shown by reference number 112, assume that the user interacts with a user interface element associated with an AR view.

As shown in FIG. 1F, the user device may provide, for display, an AR view associated with surroundings of the user device. For example, as shown, the user device may provide, for display, imagery captured by a camera of the user device and superimposed AR overlays. In some implementations, the user device may include functionality for determining geolocation information. For example, geolocation information may include information that identifies a geographic location (e.g., geographic coordinates, or the like) and/or an orientation (e.g., a horizontal and/or vertical orientation, or the like) of the user device. In some implementations, the user device may utilize global positioning system (GPS) information, compass information, and/or accelerometer information to determine the geolocation information. In some implementations, the user device may provide, for display, the superimposed AR overlays based on geolocation information of the user device. That is, the user device may superimpose a particular AR overlay, that corresponds to a real-world surrounding (e.g., a building, a venue, etc.), in association with the real-world surrounding based on geolocation information.

As shown in FIG. 1G, the user device may provide, for display, an AR overlay associated with the selected mission. For example, assume that the user directs the user device towards a particular building. As shown, the AR overlay may be superimposed in association with the building. For example, the AR application may cause imagery data, associated with a camera of the user device, to be superimposed with the AR overlay based on geolocation information of the user device (e.g., that indicates that the user device is directed towards the building). As shown, the user device may provide, for display, information that identifies a direction and/or a distance to a starting point of the mission. As an example, assume that the starting point of the mission includes a kiosk device (e.g., a smart kiosk device that includes wireless local area network (WLAN) connectivity). Additionally, assume that the user navigates to the kiosk device. In some implementations, a starting point of a mission may include a destination point of another mission, a centralized geolocation of a set of missions, a particular geolocation associated with an entity (e.g., a featured starting point or destination), or the like.

As shown in FIG. 1H, the user device may utilize a quick response (QR) code scanner to interact with the kiosk device. As an example, the user may direct the user device towards the kiosk device to scan a QR code that is being provided for display via the kiosk device. In some implementations, the kiosk device may provide, to the user device via a WLAN connection, information associated with a mission based on the user device scanning the QR code. As an example, in this case, the kiosk device may provide, to the user device, information associated with the selected mission (e.g., background information associated with the building). In some implementations, the kiosk device may provide the information associated with the mission. Additionally, or alternatively, the kiosk device may provide connectivity between the user device and the engagement platform, and the user device may receive the information from the engagement platform (or another server device).

As shown in FIG. 1I, the user device may provide, for display, information associated with the selected mission. For example, the user device may provide, for display, imagery captured by the user device and AR overlays associated with the selected mission. For example, as shown, particular AR overlays may correspond to particular buildings that are being provided for display via the user interface of the user device. As shown by reference number 114, assume that the user interacts with a particular AR overlay.

As shown in FIG. 1J, the user device may provide, for display, information associated with the selected AR overlay. For example, the selected AR overlay corresponds to a particular building. In this case, the user device may provide, for display, content associated with the particular building, such as images, text, audio, etc. For example, the information associated with the mission may include content, such as background information of the building, historical image information associated with the building, or the like. The user may interact with the user device to scroll through the content, which may cause the user device to update a display of the content. Assume that the user scrolls through the entirety of the content.

As shown in FIG. 1K, the user device may provide, for display, imagery captured by the user device and updated AR overlays associated with the selected mission. For example, the user device may update an AR overlay associated with the building, thereby indicating that the user completed a portion of the mission corresponding to the building. As shown by reference number 116, assume that the user interacts with another AR overlay associated with another building. In this case, the user device may provide, for display, information associated with the other building in a similar manner as described above in connection with FIG. 1J. Assume that the user completes the portion of the mission associated with the other building.

As shown in FIG. 1L, the user device may provide, for display, updated imagery and an updated AR overlay based on the user adjusting an orientation of the user device. As shown by reference number 118, assume that the user interacts with the AR overlay, and completes the portion of the mission in a similar manner as described above.

As shown in FIG. 1M, the user device may provide, for display, information that identifies that the user has completed the selected mission. As shown, the user device may provide, for display, information that identifies a "level" associated with the user. For example, the application may include a user profile associated with the user (e.g., information that identifies a name, a picture, a set of interests, etc. associated with the user). In some implementations, the user may be associated with a particular level (e.g., a rank, a designation, or the like) based on an amount of completed missions. Additionally, or alternatively, a user may obtain points, rewards, etc. based on completing missions, based on generating user generated content, based on interacting with other users and/or entities, etc.

As shown in FIG. 1N, the user device may provide, for display, a map view of the location that includes additional missions. As shown by reference number 120, assume that the user interacts with a "current" mission (e.g., "Food Fest"). In some implementations, a current mission may include a mission that involves a live and/or approaching event, such as a food fair, a parade, a concert, a performance, or the like. For example, users associated with particular entities (e.g., local businesses, local organizations, etc.) may create sponsored missions that involve the particular entities.

As shown in FIG. 1O, the user device may provide, for display, information associated with the selected mission. For example, as shown, the user device may provide, for display, content that identifies information associated with the event. As an example, the information associated with the selected mission may include a time of the event, a location of the event, a hyperlink that may provide access to a resource associated with the event, a list of people that have signed up for the event, comments associated with the event, or the like.

As shown in FIG. 1P, the user device may provide, for display, information based on real-time information associated with sensor devices. For example, the engagement platform may receive, from sensor devices (e.g., IoT sensors, such as traffic cameras, kiosk device cameras, environmental sensors, sensors associated with other user devices, sensors associated with unmanned aerial vehicles (UAVs), or the like), information associated with a geolocation (e.g., that identifies an increase in traffic associated with the geolocation, an increase in an amount of people associated with the geolocation, safety issues associated with the geolocation, or the like). Additionally, the engagement platform may provide, to the user device and based on a geolocation of the user device, the real-time information associated with the sensor devices. For example, as shown, the user device may provide, for display, information that identifies that traffic congestion is likely based on traffic analysis.

As shown in FIG. 1Q, the user device may provide, for display, information that enables a user to generate content associated with the geolocation. For example, a user may interact with the user device to generate content (e.g., user generated content, such as an image, text, video, etc.) in association with the geolocation, which may cause the user device to provide, to the engagement platform, information that identifies the user generated content. Additionally, other user devices may receive and provide, for display, information that identifies the user generated content. In this way, a user may contribute a thought, provide an opinion, report an issue, solicit feedback, or the like, in association with the geolocation. As an example, assume that the user locates a particular issue associated with the geolocation (e.g., a trash receptacle has exceeded capacity), and wishes to report the issue to an entity that is responsible for handling the issue and/or wishes to notify other users of the issue.

As shown in FIG. 1R, the user may interact with the user device to capture an image associated with the trash receptacle. As shown in FIG. 1S, the user may interact with the user device to input text, audio, video, etc., in association with the image, and as shown by reference number 122, may interact with the user device to provide an alert. For example, an alert may include information that may be provided to an entity server device associated with an entity (e.g., a government agency, or the like).

As shown in FIG. 1T, another user device (e.g., associated with another user) may provide, for display, information associated with the user generated content. For example, based on geolocation information of the other user device, the other user device may receive, from the engagement platform, information that identifies the user generated content and provide the information that identifies the user generated content for display. In this way, the other user may interact with the user generated content (e.g., may up-vote, down-vote, flag, comment, etc.), which may cause the other user device to provide response information to the engagement platform (e.g., information that is responsive to and/or involves the user generated content). Additionally, in this way, the engagement platform may provide, to the entity server device, information that identifies the user generated content (e.g., the alert) and the response information. In this way, users that are associated with a geolocation may identify an issue and cause respective user devices to provide information that identifies the issue to the engagement platform and/or the entity server device. Additionally, in this way, an entity that is responsible for performing a particular action in association with the geolocation may identify the information associated with the issue, and take corrective action.

In this way, implementations described herein enable a user device to provide an AR application that enables a user to ascertain information associated with a location, report issues associated with a location, foster discourse in the community associated with a location, or the like. Additionally, implementations described herein enable an engagement platform to provide, to a user device, information that is associated with a geolocation (e.g., pertinent information that identifies historical information, current events, ongoing conversations, safety issues, etc.). In this way, the user device may receive and provide, for display, the information, thereby enabling a user to readily ascertain the pertinent information. In this way, implementations described herein reduce an amount of searches (e.g., initiated by a user) for information associated with a geolocation, thereby conserving processor, memory, and/or network resources (e.g., based on providing pertinent information). Additionally, implementations described herein enable the engagement platform to receive, from sensor devices and/or user devices, real-time information (e.g., real-time sensor information which is output from a sensor substantially concurrently with the sensor detecting the information) associated with a geolocation. Additionally, implementations described herein enable the engagement platform to provide, to a user device, the real-time information. The user device may provide, for display, the real-time information as one or more AR overlays.

As indicated above, FIGS. 1A-1T are provided merely as an example. Other examples are possible and may differ from what was described with regard to FIGS. 1A-1T.

Figure 2:
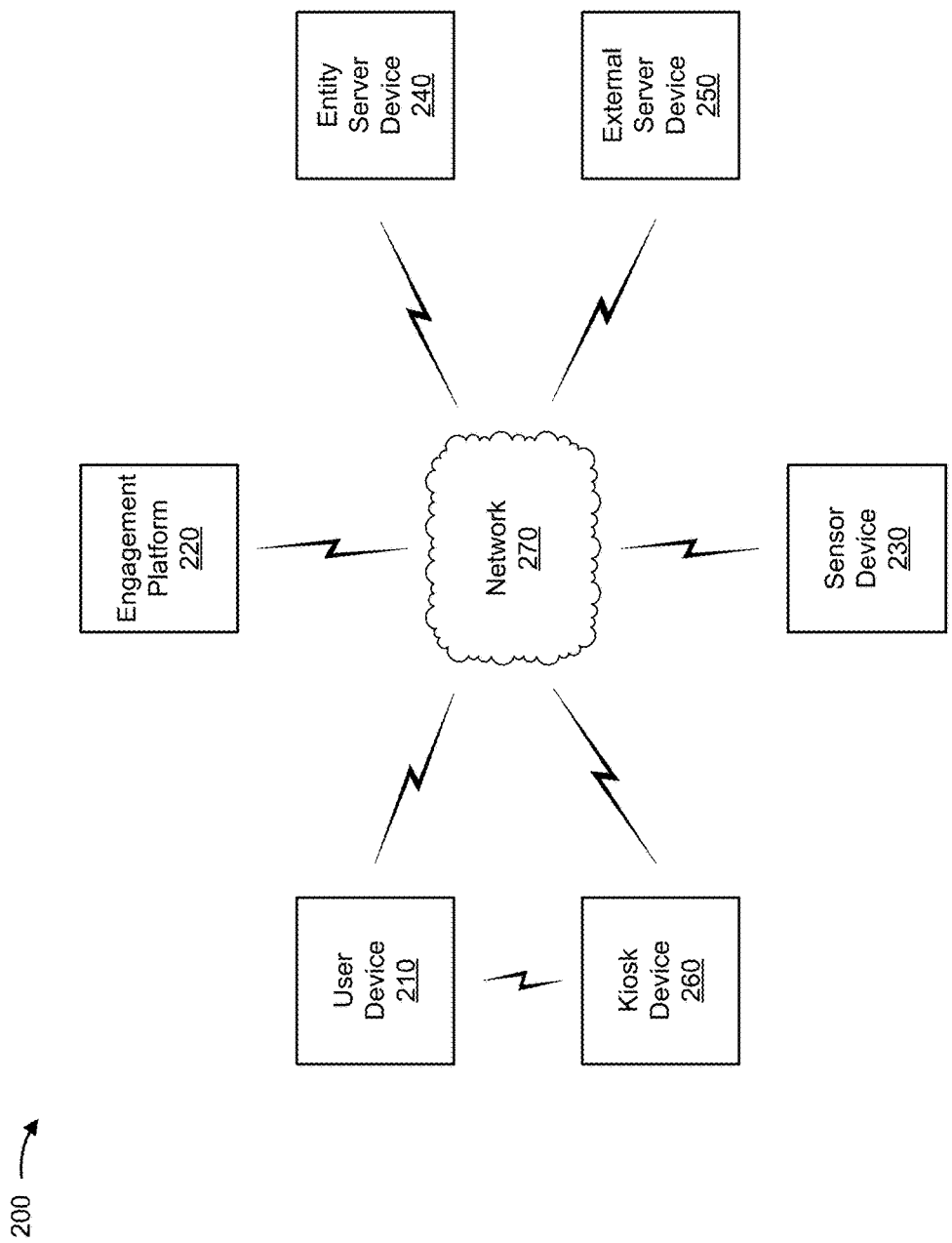
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an engagement platform 220, a sensor device 230, an entity server device 240, an external server device 250, a kiosk device 260, and a network 270. Devices of environment 200 may interconnect via wired connections, wireless connections, or a combination of wired and wireless connections.

User device 210 includes one or more devices capable of receiving, generating, storing, processing, and/or providing information associated with real-time information associated with a geolocation. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, an AR and/or VR headset device, etc.), or a similar type of device.

Engagement platform 220 includes one or more devices capable of receiving, processing, storing, and/or providing real-time information associated with a geolocation. For example, engagement platform 220 may include a computing device, such as a server (e.g., an application server, a cloud server, a host server, a web server, a hypertext transfer protocol (HTTP) server, etc.), a network device, or a similar device. In some implementations, engagement platform 220 may provide an application programming interface (API), and/or may request and/or receive information, from user device 210, sensor device 230, entity server device 240, and/or external server device 250 via one or more APIs.

In some implementations, engagement platform 220 may be hosted in a cloud computing environment. For example, the cloud computing environment may include a group of computing resources, such as applications, virtual machines, virtualized storage, hypervisors, or the like. In some implementations, the cloud computing environment may provide computation, software, data access, storage, etc. services that do not require end-user (e.g., user device 210) knowledge of a physical location and configuration of system(s) and/or device(s) that hosts engagement platform 220. In some implementations, engagement platform 220 may not be cloud-based (i.e., may be implemented outside of a cloud computing environment) or may be partially cloud-based.

Sensor device 230 includes one or more devices capable of receiving, processing, storing, and/or providing real-time information associated with a geolocation. In some implementations, sensor device 230 includes one or more machine-to-machine (M2M) devices and/or one or more IoT devices. For example, sensor device 230 may include a camera (e.g., a traffic camera, a security camera, a camera associated with a UAV, etc.), an environmental sensor (e.g., a temperature sensor, a light sensor, an air quality sensor, a smoke sensor, a pressure sensor, a noise sensor, etc.), a vehicle sensor, a traffic sensor, a biometric device, a security device, and/or a similar type of device. In other words, sensor device 230 may be any "thing" in the IoT. While FIG. 2 shows a single sensor device 230, in practice, there may be hundreds, thousands, or millions of sensor devices 230 detecting various kinds of sensor data.

Entity server device 240 includes one or more devices capable of receiving, storing, processing, and/or providing information associated with an entity. For example, entity server device 240 may include a computing device, such as a server device or a similar device. In some implementations, entity server device 240 may provide, to a client device (e.g., a desktop computer, a smart phone, or the like), a dashboard (e.g., user interface) that enables a user (e.g., a person affiliated with the entity, such as a government official, or the like) to view information associated with a geolocation, provide information in association with the geolocation, or the like.

External server device 250 includes one or more devices capable of receiving, storing, processing, and/or providing information associated with a geolocation. For example, external server device 250 may include a computing device, such as a server device or a similar device. In some implementations, external server device 250 may provide information, such as historical information, current information, background information, etc. associated with a geolocation.

Kiosk device 260 includes one or more devices capable of receiving, storing, processing, and/or providing information associated with a geolocation. For example, kiosk device 260 may include a computing device that may provide WLAN connectivity to user device 210. For example, kiosk device 260 may interface with user device 210 via a QR code, a near-field communication (NFC), a radio-frequency identification (RFID), Bluetooth, a WLAN, and/or the like, and may provide information to user device 210, and/or provide connectivity to network 270. In some implementations, kiosk device 260 may provide, for display, information associated with a geolocation (e.g., weather information, transit information, public information, hyper-local advertisement information, etc.).

Network 270 includes one or more wired and/or wireless networks. For example, network 270 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
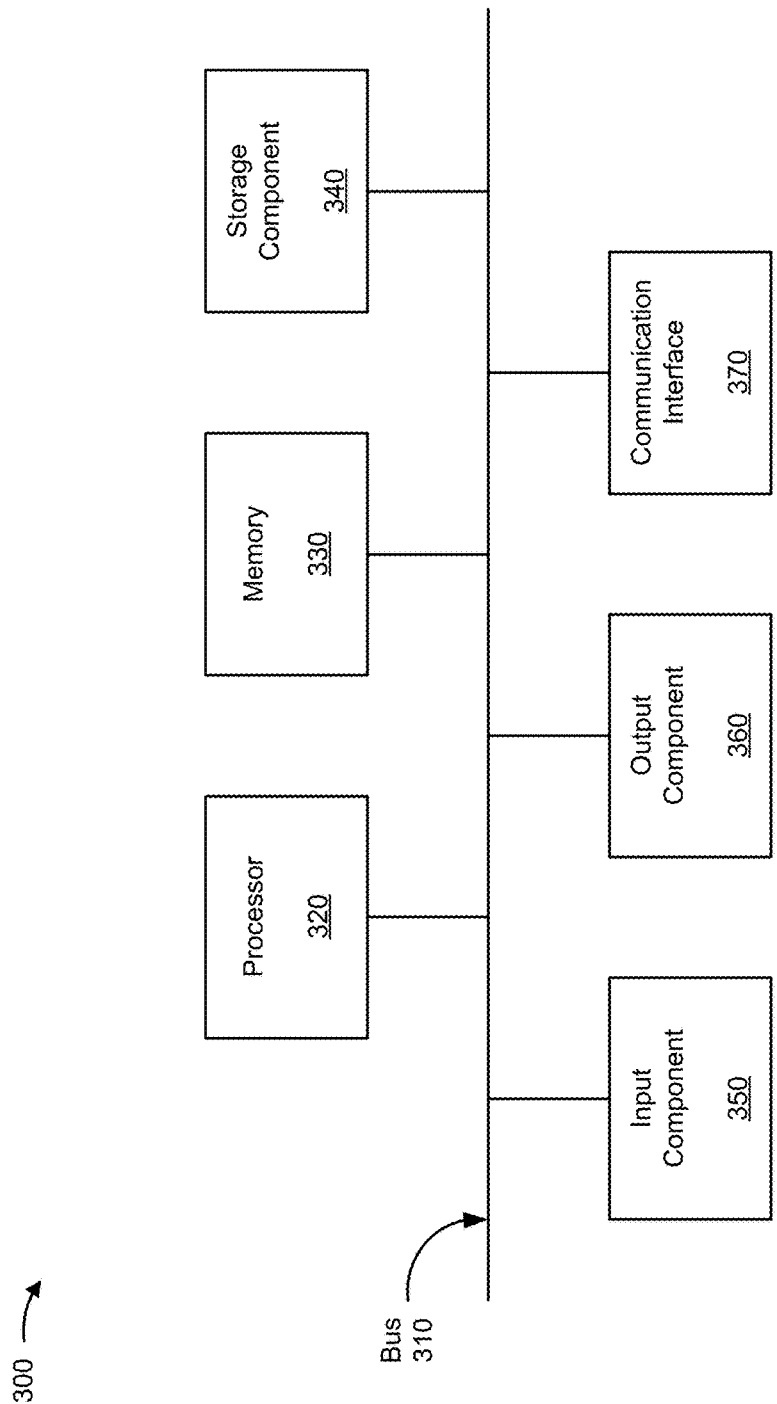
FIG. 3 is a diagram of example components of one or more devices of FIG. 2.

FIG. 3 is a diagram of example components of a device 300. Device 300 may correspond to user device 210, engagement platform 220, sensor device 230, entity server device 240, external server device 250, and/or kiosk device 260. In some implementations, user device 210, engagement platform 220, sensor device 230, entity server device 240, external server device 250, and/or kiosk device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, a compass, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
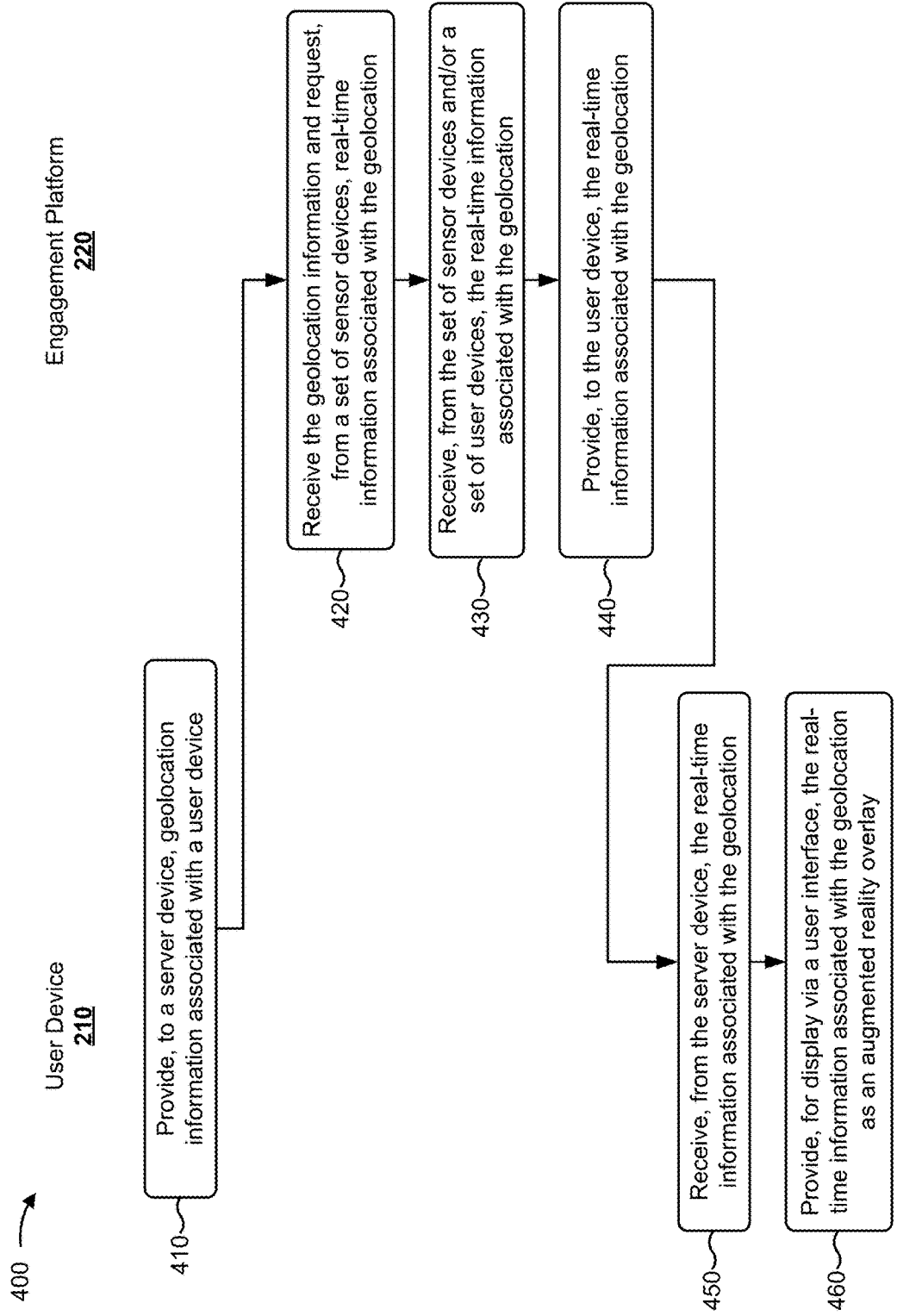
FIG. 4 is a flow chart of an example process for providing real-time sensor based information via an augmented reality application.

FIG. 4 is a flow chart of an example process 400 for providing real-time sensor based information via an augmented reality application. In some implementations, one or more process blocks of FIG. 4 may be performed by user device 210 and/or engagement platform 220. In some implementations, one or more process blocks of FIG. 4 may be performed by another device or a group of devices separate from or including user device 210 and/or engagement platform 220 such as sensor device 230, entity server device 240, external server device 250, and/or kiosk device 260.

As shown in FIG. 4, process 400 may include providing, to a server device, geolocation information associated with a user device (block 410). For example, user device 210 may provide, to engagement platform 220, geolocation information that identifies a geographic location and/or an orientation of user device 210. In some implementations, user device 210 may include functionality for determining geolocation information of user device 210. For example, user device 210 may utilize GPS information, compass information, accelerometer information, signal triangulation, and/or the like to determine geolocation information and/or an orientation of user device 210. Additionally, or alternatively, user device 210 may establish a connection (e.g., a WLAN connection, an NFC connection, etc.) with kiosk device 260, and provide the geolocation information based on establishing the connection.

As further shown in FIG. 4, process 400 may include receiving the geolocation information and requesting, from a set of sensor devices, real-time information associated with the geolocation (block 420). For example, engagement platform 220 may receive, from user device 210, the geolocation information, determine a set of sensor devices 230 associated with the geolocation, and request real-time information associated with the geolocation from the set of sensor devices 230.

In some implementations, engagement platform 220 may determine a set of sensor devices 230 associated with the geolocation based on information stored in a data structure, based on information received from another device (e.g., sensor device 230, entity server device 240, etc.), or the like. In some implementations, engagement platform 220 may identify particular types of sensor devices 230 based on the set of sensor devices 230, and identify particular communication protocols for communicating with sensor devices 230. For example, the set of sensor devices 230 may include different types of sensor devices 230 (e.g., traffic cameras, cameras associated with UAVs, temperature sensors, etc.) that may implement different communication protocols and/or provide information associated with different data formats, etc.

In some implementations, engagement platform 220 may request the real-time information from each sensor device 230 of the set of sensor devices 230. Alternatively, engagement platform 220 may request the real-time information from a subset of sensor devices 230. In some implementations, engagement platform 220 may identify multiple sensor devices 230 that are capable of providing the same type of information, and may request the real-time information from a particular sensor device 230 (e.g., may reduce an amount of redundant information that is received and/or processed, thereby conserving processor and/or memory resources).

In some implementations, engagement platform 220 may determine a score for each sensor device 230, and request the real-time information from sensor devices 230 that are associated with scores that satisfy a threshold, or the like. For example, engagement platform 220 may determine a score for a particular sensor device 230 based on an amount of user devices 210 that are providing the real-time information, associated with the particular sensor device 230, for display as an AR overlay (e.g., may determine the score based on popularity, feedback, etc. associated with the particular sensor device 230).

In some implementations, engagement platform 220 may determine the set of sensor devices 230 based on performing a technique. For example, engagement platform 220 may use one or more machine learning techniques to analyze data (e.g., training data) and create models. The techniques may include, for example, supervised and/or unsupervised techniques, such as artificial networks, case-based reasoning, Bayesian statistics, learning automata, Hidden Markov Modeling, linear classifiers, quadratic classifiers, decision trees, association rule learning, or the like. Additionally, or alternatively, engagement platform 220 may use another kind of computer-implemented technique, such as artificial intelligence, machine perception, or computer vision, to analyze data and generate models.

In some implementations, engagement platform 220 may identify the set of sensor devices 230 based on the geolocation information associated with user device 210, and request the real-time information. In some implementations, real-time information may include real-time sensor information which is output from sensor device 230 substantially concurrently with sensor device 230 detecting the information. Additionally, or alternatively, real-time information may include information which is provided, by user device 210 for display, substantially concurrently with sensor device 230 detecting the information (e.g., within a threshold time frame of sensor device 230 detecting the information, providing the information to engagement platform 220, or the like).

In some implementations, engagement platform 220 may provide, to sensor devices 230, requests that identify a time frame for which to provide the real-time information. Additionally, or alternatively, engagement platform 220 may provide an instruction to sensor device 230 that causes sensor device 230 to refrain from providing the real-time information (e.g., based on user device 210 not being associated with the geolocation, not executing the AR application, or the like). In this way, engagement platform 220 may request real-time information from a subset of sensor devices 230 that are associated with the geolocation, may request real-time information for a particular time frame, etc., thereby conserving processor and/or memory resources of engagement platform 220 and/or sensor devices 230, and/or thereby conserving network resources.

As further shown in FIG. 4, process 400 may include receiving, from the set of sensor devices and/or a set of user devices, the real-time information associated with the geolocation (block 430). For example, engagement platform 220 may receive, from the set of sensor devices 230 and/or a set of user devices 210, real-time information associated with the geolocation. In some implementations, sensor devices 230 may provide real-time information, such as live video information, environmental condition information, traffic information, parking information, security information, emergency information, etc. In some implementations, engagement platform 220 may receive the real-time information and perform a normalization technique, a standardization technique, etc. For example, the set of sensor devices 230 may provide different types of information that include different data formats, different file types, etc. In this way, engagement platform 220 may more efficiently process the information than as compared to if engagement platform 220 does not perform the technique(s), thereby conserving processor and/or memory resources of engagement platform 220 and/or user device 210.

In some implementations, engagement platform 220 may analyze the real-time information and detect a condition. For example, engagement platform 220 may receive live video information from sensor devices 230, and perform an analytics technique to extract information such as parking availability, traffic conditions, pedestrian crowd levels, etc. In this way, engagement platform 220 may provide, to user devices 210, the real-time information and/or analytics information to enable users of user devices 210 to identify particular conditions associated with the geolocation. In some implementations, engagement platform 220 may analyze real-time information to identify a particular user, detect a particular condition, or the like. That is, engagement platform 220 may perform a surveillance technique in association with the real-time information to detect a particular condition.

In some implementations, user devices 210 may provide, to engagement platform 220, real-time information associated with the geolocation. In some implementations, the real-time information associated with the geolocation may include information that is provided, to engagement platform 220, substantially concurrently with the occurrence of an underlying event, activity, action, etc., with the capture of the information by user device 210 and/or sensor device 230, with the generation of the information by user device 210 and/or sensor device 230, with the determination of the information by user device 210 and/or sensor device 230, or the like.

As an example, user devices 210 may provide information that identifies user generated content, such as reports indicating safety concerns, opinions regarding particular areas and/or proposed actions associated with the geolocation, requests for particular actions to be performed in association with the geolocation, conversations associated with the geolocation, or the like.

As further shown in FIG. 4, process 400 may include providing, to the user device, the real-time information associated with the geolocation (block 440). For example, engagement platform 220 may provide, to user device 210, the real-time information associated with the geolocation. In some implementations, engagement platform 220 may provide the real-time information associated with the geolocation. Alternatively, engagement platform 220 may provide a subset of the real-time information associated with the geolocation. For example, in a similar manner as described above in connection with block 420, engagement platform 220 may determine particular real-time information to provide to user device 210 based on a score associated with an underlying sensor device 230 and/or user device 210, based on performing a technique, and/or the like.

In some implementations, engagement platform 220 may receive, from user device 210, information that identifies a particular sensor device 230 for which engagement platform 220 is to provide the real-time information. For example, a user of user device 210 may interact with user device 210 to specify a particular sensor device 230 (e.g., a traffic camera associated with a particular intersection) for which to receive the real-time information, and engagement platform 220 may provide the real-time information associated with the particular sensor device 230. Additionally, or alternatively, a user of user device 210 may specify a particular type of sensor device 230, and engagement platform 220 may provide the real-time information associated with the particular type of sensor device 230. In this way, engagement platform 220 may provide real-time information associated with the geolocation, thereby reducing a need of the user to cause user device 210 to perform searches for particular types of information and conserving processor, memory, and/or network resources as a result.

As further shown in FIG. 4, process 400 may include receiving, from the server device, the real-time information associated with the geolocation (block 450), and providing, for display via a user interface, the real-time information associated with the geolocation as an augmented reality overlay (block 460). For example, user device 210 may receive, from engagement platform 220, the real-time information associated with the geolocation, and provide, for display via a user interface, the real-time information including AR overlays.

In some implementations, user device 210 may provide multiple AR overlays that correspond to different sensor devices 230. As an example, user device 210 may provide, for display, respective AR overlays that correspond to real-time information associated with respective sensor devices 230. As an example, assume that a first AR overlay corresponds to a first area of the geolocation and that a second AR overlay corresponds to a second area of the geolocation. In this case, the first AR overlay may indicate that the first area is associated with a first amount of people (e.g., a crowd), and the second AR overlay may indicate that the second area is associated with a second amount of people that is less than the first amount of people (e.g., is less crowded). The user may, for example, determine to take a particular action in association with the second area based on the real-time information provided as AR overlays.

In some implementations, a user may interact with user device 210 (e.g., perform a touch gesture in association with an AR overlay) to select a particular AR overlay. In this case, user device 210 may provide, for display, the real-time information associated with sensor device 230. In some implementations, the AR overlay may be indicative of the real-time information. As an example, assume that a first sensor device 230 (e.g., a sensor that may detect people) is associated with a first building, such as a store that is associated with a large crowd, or the like. Additionally, assume that a second sensor device 230 is associated with a second building that is associated with a smaller crowd as compared to the first building. In this case, user device 210 may provide, for display, a first AR overlay associated with the first sensor device 230 that may be indicative of the large crowd (e.g., "busy," "long wait time expected," "crowded," etc.). Additionally, the second AR overlay may be indicative of the smaller crowd associated with the second building (e.g., "quick wait times," "immediate seating available," etc.).

In some implementations, the AR overlay may include the real-time information. For example, assume that an AR overlay corresponds to a live traffic feed of a particular intersection. In this case, the user may interact with user device 210 to select the particular AR overlay, and user device 210 may provide, for display, real-time information associated with the live traffic feed (i.e., may display the live traffic feed). In other implementations, the AR overlay may include live streaming video content and/or streaming video content. For example, assume that sensor device 230 is capturing live video information associated with a geolocation. In this case, user device 210 may provide, for display, the live video information as an AR overlay.

In some implementations, engagement platform 220 may receive updates regarding geolocation information of user device 210, and perform operations associated with blocks 420-440 based on the updated geolocation information. In some implementations, engagement platform 220 may perform operations associated with blocks 420-440 based on a combination of information that identifies a geographic location of user device 210 and/or information that identifies an orientation of user device 210. For example, engagement platform 220 may perform operations associated with blocks 420-440 based on information that identifies a geographic location of user device 210 and information that identifies an orientation of user device 210. Additionally, or alternatively, engagement platform 220 may perform operations associated with blocks 420-440 based on information that identifies a geographic location of user device 210 or information that identifies an orientation of user device 210.

In some implementations, engagement platform 220 may perform operations associated with blocks 420-440 based on receiving information that identifies a geographic location (and/or an updated geographic location) of user device 210 (e.g., as a user moves in a particular direction while an orientation of user device 210 remains static). In other cases, engagement platform 220 may perform operations associated with blocks 420-440 based on receiving information that identifies an orientation (and/or an updated orientation) of user device 210 (e.g., as an orientation of user device 210 changes while a geographic location of user device 210 remains static). Additionally, or alternatively, in yet other cases, engagement platform 220 may perform operations associated with blocks 420-440 based on receiving information that identifies a geographic location (and/or an updated geographic location) and information that identifies an orientation (and/or an updated orientation) of user device 210.

In this way, implementations described herein enable engagement platform 220 to determine a set of sensor devices 230 that are associated with a particular geolocation, and provide, to user device 210, real-time information associated with the set of sensor devices 230. In this way, a user of user device 210 may more readily identify information associated with a particular geolocation, which may reduce the need of the user to cause user device 210 to perform searches for particular information associated with the geolocation, thereby conserving processor and/or memory resources of user device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
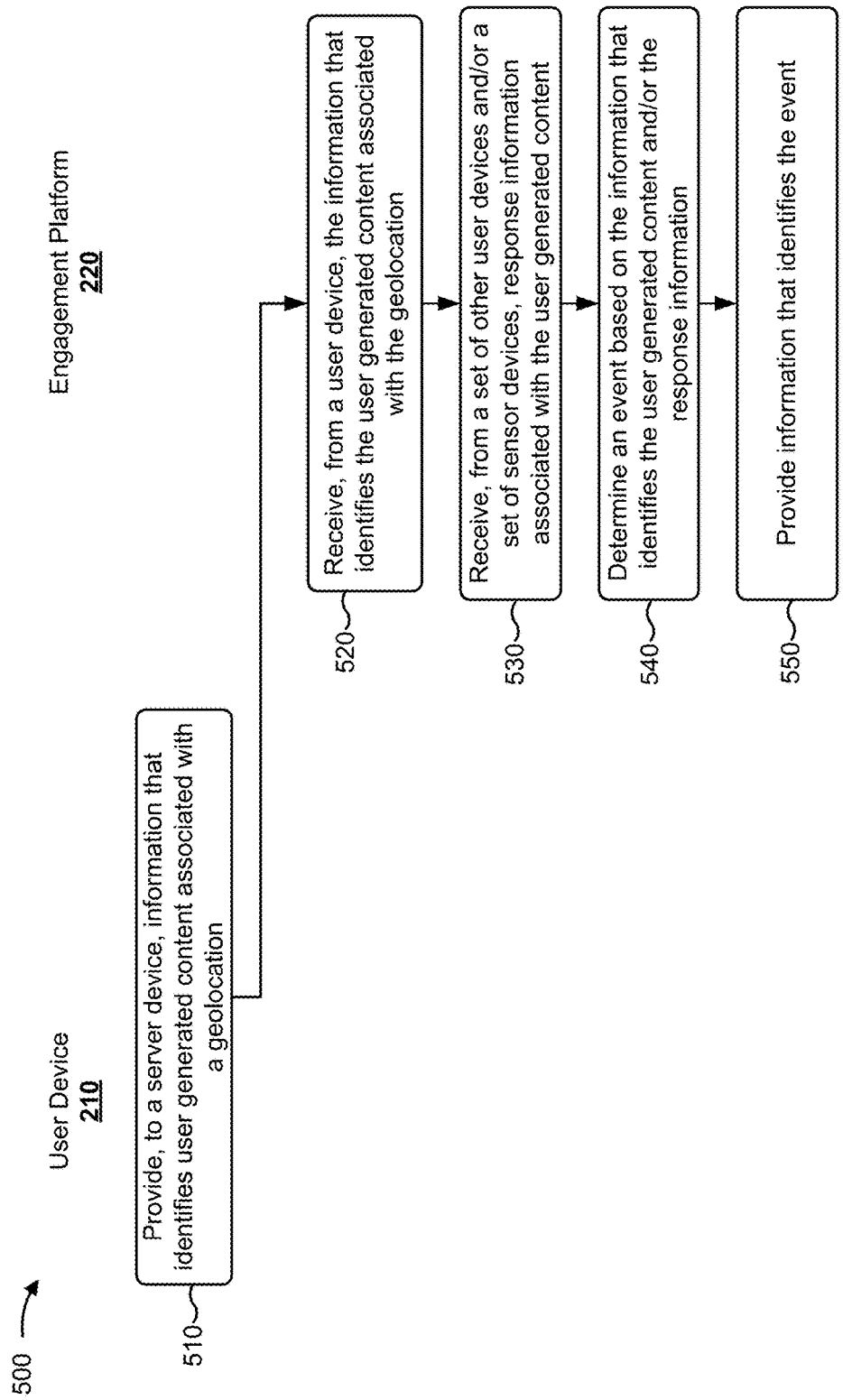
FIG. 5 is a flow chart of an example process for providing information to an entity server based on crowdsourced information associated with a geolocation.

FIG. 5 is a flow chart of an example process 500 for providing information to an entity server based on crowd-sourced information associated with a geolocation. In some implementations, one or more process blocks of FIG. 5 may be performed by user device 210 and/or engagement platform 220. In some implementations, one or more process blocks of FIG. 5 may be performed by another device or a group of devices separate from or including user device 210 and/or engagement platform 220 such as sensor device 230, entity server device 240, external server device 250, and/or kiosk device 260. In some implementations, one or more process blocks of FIG. 5 may be performed before, after, concurrently with, in conjunction with, or based on one or more process blocks of FIG. 4.

As shown in FIG. 5, process 500 may include providing, to a server device, information that identifies user generated content associated with a geolocation (block 510). For example, user device 210 may provide, to engagement platform 220, information that identifies user generated content associated with a geolocation. In some implementations, the user generated content may include an image, a video, audio, text, etc., that may be indicative of an opinion regarding the geolocation, an issue associated with the geolocation, a safety concern associated with the geolocation, an opinion regarding a proposed action associated with the geolocation, a request for a particular action to be performed in association with the geolocation, a request to solicit feedback from other users associated with the geolocation, an initiation of a conversation, an offer for sale of a good or service, a request for a good or service, or the like.

For example, and in a similar manner as described above in connection with FIGS. 1A-1T, a user may interact with user device 210 to generate user generated content. In some implementations, the user generated content may be provided, for display by other user devices 210, as a "user pin." In this way, engagement platform 220 may determine a priority level associated with particular user generated content, and may provide, to user devices 210, information that identifies and/or is indicative of the priority level. Additionally, in this way, respective user devices 210 may provide, for display, particular user generated content based on the priority level, thereby facilitating discourse between users (e.g., citizens, entity officials, etc.) of the geolocation.

As further shown in FIG. 5, process 500 may include receiving, from a user device, the information that identifies the user generated content associated with the geolocation (block 520), and receiving, from a set of other user devices and/or a set of sensor devices, response information associated with the user generated content (block 530). For example, engagement platform 220 may receive, from user device 210, the information that identifies the user generated content, and may receive, from other user devices 210 and/or sensor devices 230, response information associated with the user generated content and/or the geolocation.

In some implementations, engagement platform 220 may receive, from user device 210, the information that identifies the user generated content, and provide the information that identifies the user generated content to other user devices 210. For example, the other user devices 210 may include AR applications, as discussed above in connection with FIGS. 1A-1T, that enable the other user devices 210 to provide, for display, the information that identifies the user generated content. That is, other user devices 210 may provide, for display, information that identifies the user generated content based on geolocations of the respective user devices 210 coinciding with the geolocation of the user generated content. In some implementations, the other user devices 210 may provide information that identifies the user generated content as AR overlays.

In some implementations, engagement platform 220 may receive response information based on providing the information that identifies the user generated content to the other user devices 210. In some implementations, the response information may be indicative of an opinion regarding the user generated content (e.g., approval, disapproval, ambivalence, etc.), feedback regarding the user generated content, corroboration of the user generated content, or the like. For example, users associated with the other user devices 210 may interact with respective user devices 210 to provide response information (e.g., an up-vote, a down-vote, a "like," a flag, a comment, etc.) regarding the user generated content.

In some implementations, sensor device 230 may provide, to engagement platform 220, the response information. For example, sensor device 230 may provide real-time information associated with a geolocation of the user generated content. As an example, assume that user device 210 provides information associated with user generated content that identifies a safety issue (e.g., "suspicious person spotted near the subway station."). In this case, engagement platform 220 may receive the information, and obtain response information from sensor devices 230 associated with the geolocation of the user generated content. For example, engagement platform 220 may obtain camera imagery associated with the geolocation that corresponds to the time of generation of the user generated content. In this way, engagement platform 220 may provide, to other user devices 210 and/or entity server device 240, information associated with the safety issue (e.g., an event), as described elsewhere herein.

As further shown in FIG. 5, process 500 may include determining an event based on the information that identifies the user generated content and/or the response information (block 540), and providing information that identifies the event (block 550). For example, engagement platform 220 may determine an event based on the information that identifies the user generated content and/or the response information, and provide, to user devices 210 and/or entity server device 240, information that identifies the event. In some implementations, engagement platform 220 may process information associated with hundreds, thousands, millions, etc. of concurrent events. Additionally, engagement platform 220 may use one or more big data processing techniques to process the information associated with the events.

In some implementations, an event may be indicative of a safety issue, a threat, an environmental condition, a consensus regarding a request for an entity to perform a particular action, a consensus regarding a request for an entity to refrain from taking a particular action, a consensus regarding a particular proposal (e.g., a construction proposal, a spend proposal, etc.) associated with a geolocation, an opinion regarding a particular geolocation, etc.

In some implementations, engagement platform 220 may determine an event based on the information that identifies the user generated content and the response information. For example, engagement platform 220 may identify an amount of user devices 210 that have provided response information, determine that the amount satisfies a threshold, and determine an event based on the amount satisfying the threshold. Additionally, or alternatively, engagement platform 220 may determine an event based on performing a sentiment analysis, performing analytics in association with the user generated content and/or the response information, determining a nature of the response information (e.g., an amount of user devices 210 that have provided positive feedback, such as an up-vote), or the like.

In some implementations, engagement platform 220 may determine an event based on an amount of user devices 210 that are associated with similar user generated content. For example, assume that a set of user devices 210 provide, to engagement platform 220, information that identifies similar user generated content (e.g., content involving the same issue, content involving the same request, etc.). In this case, engagement platform 220 may determine an event based on an amount of user devices 210 that provided the similar user generated content.

In some implementations, engagement platform 220 may determine an event based on activities associated with respective user devices 210. For example, assume that user devices 210 are executing an AR application. In this case, engagement platform 220 may collect information associated with user devices 210 that are executing the AR application (e.g., application activity), and determine an event based on the information. As examples, engagement platform 220 may identify that a threshold amount of user devices 210 are associated with a particular mission, are located in a particular geolocation, have completed a particular mission, are performing a particular mission, have provided feedback regarding a particular mission, or the like. In this way, a user associated with entity server device 240 may identify analytics associated with a particular geolocation and determine an amount of particular activity associated with an AR application regarding the geolocation. In this way, engagement platform 220 may receive information associated with user devices 210, without requiring that users of user devices 210 interact with user devices 210 to generate content. That is, engagement platform 220 may receive analytics information associated with user devices 210 and/or sensor devices 230.

In some implementations, engagement platform 220 may provide, to entity server device 240, information that identifies the event. For example, entity server device 240 may provide, to a user device 210 associated with the entity, information associated with a dashboard (e.g., a user interface). Additionally, a user (e.g., an official associated with the entity, or the like) may view, via the dashboard, the information that identifies the event. For example, user device 210 (e.g., associated with the entity) may provide, for display via the dashboard, information that identifies the user generated content and response information from other user devices 210 and/or sensor devices 230.

In some implementations, a user associated with the entity may interact with a respective user device 210, which may cause information to be provided to engagement platform 220 and/or other user devices 210. Continuing the example described elsewhere herein, assume that the user associated with the entity views the user generated content (e.g., "suspicious person spotted near the subway station"), and identifies, based on imagery received from sensor devices 230, a potential suspect. In this case, the user associated with the entity may interact with the respective user device 210 to generate alert information (e.g., "Armed suspect in the area. Take shelter."). Additionally, the respective user device 210 may cause entity server device 240 to provide, to engagement platform 220 and/or user devices 210, the alert information and/or information associated with imagery captured from sensor devices 230 (e.g., an image of the potential suspect). In this way, user devices 210, that are located within, nearby, etc. the geolocation, may receive the alert information and may provide, for display, the alert information (e.g., as an AR overlay).

In some implementations, engagement platform 220 may automatically permit and/or cause an action to be performed based on the user generated content and/or the response information. Continuing with the above example, engagement platform 220 may automatically notify devices associated with emergency vehicles and/or emergency personnel (e.g., a police department, a fire department, etc.) to provide assistance in association with the geolocation, or the like. Additionally, or alternatively, engagement platform 220 may provide, to user devices 210, the alert information without requiring that a user of the entity cause engagement platform 220 to provide the alert information.

In this way, implementations described herein enable user device 210 to provide, to engagement platform 220, information that identifies user generated content. Additionally, implementations described herein enable engagement platform 220 may receive response information, and determine an event based on the information that identifies the user generated content and/or the response information. Engagement platform 220 may provide, to entity server device 240, information that identifies the event, thereby enabling an entity to determine particular information associated with the geolocation and take appropriate action. In this way, implementations described herein conserve processor and/or memory resources by aggregating similar information and providing the information to entity server device 240, thereby reducing a need of manual processing of various information to identify events, eliminating subjective analysis of the various information, etc.

Additionally, implementations described herein enable users associated with a geolocation (e.g., citizens, inhabitants, visitors, government officials, agency officials, etc.) to exchange information in a seamless and transparent manner, thereby increasing trust and transparency between users of the geolocation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6E are diagrams of an example implementation 600 relating to example process 500 shown in FIG. 5. FIGS. 6A-6E show an example of providing information to an entity server based on crowdsourced information associated with a geolocation.

Figure 6A:
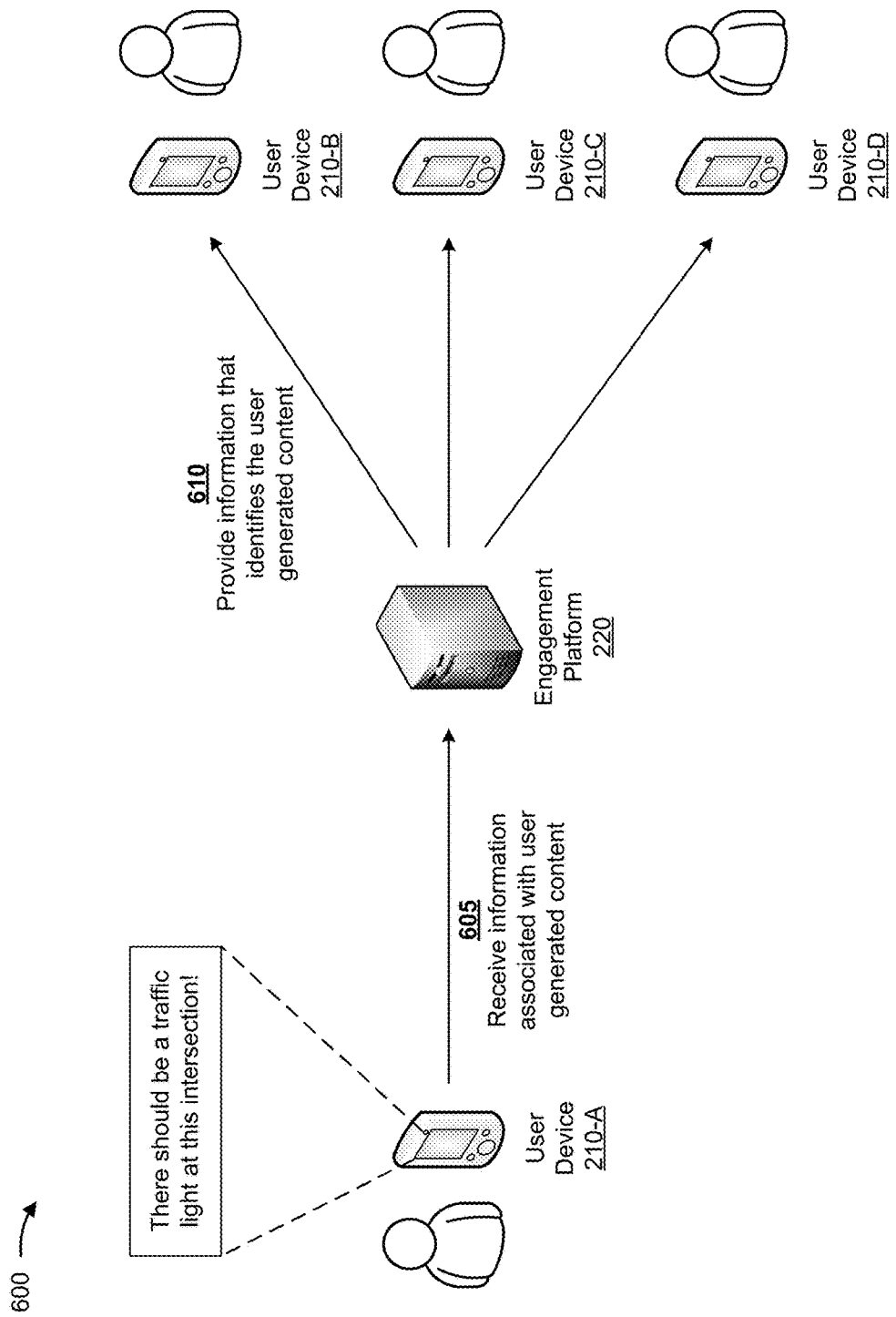

As shown in FIG. 6A, and by reference number 605, engagement platform 220 may receive, from user device 210-A, information associated with user generated content. For example, as shown, a user of user device 210-A may interact with user device 210-A to cause user device 210-A to generate user generated content (e.g., text indicating "There should be a traffic light at this intersection!"), and provide, to engagement platform 220, information that identifies the user generated content. As shown by reference number 610, engagement platform 220 may provide, to user devices 210-B, C, and D, information that identifies the user generated content as an AR overlay on user devices 210-B, C, and D (e.g., based on user devices 210-B, C, and D being located within a threshold distance of the geolocation associated with the user generated content). As an example, assume that users, associated with user devices 210-B, C, and D interact with respective user devices 210 (e.g., to provide feedback, such as an up-vote associated with the user generated content).

Figure 6B:
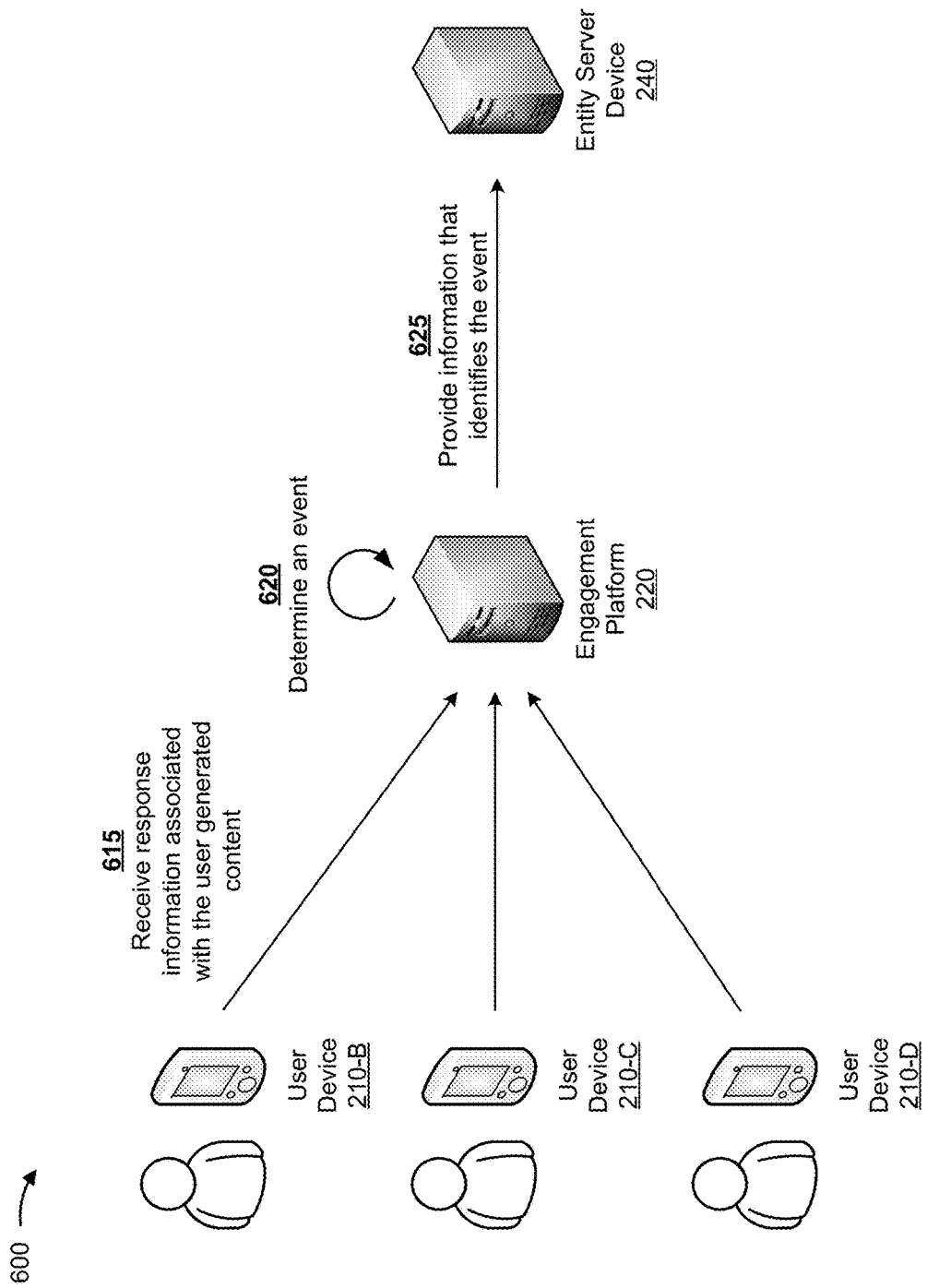

As shown in FIG. 6B, and by reference number 615, engagement platform 220 may receive, from user devices 210-B, C, and D, response information associated with the user generated content. As shown by reference number 620, engagement platform 220 may determine an event indicating that an amount of user devices 210 that have provided response information satisfies a threshold. In this case, and as shown by reference number 625, engagement platform 220 may provide, to entity server device 240, information that identifies the event.

Figure 6C:
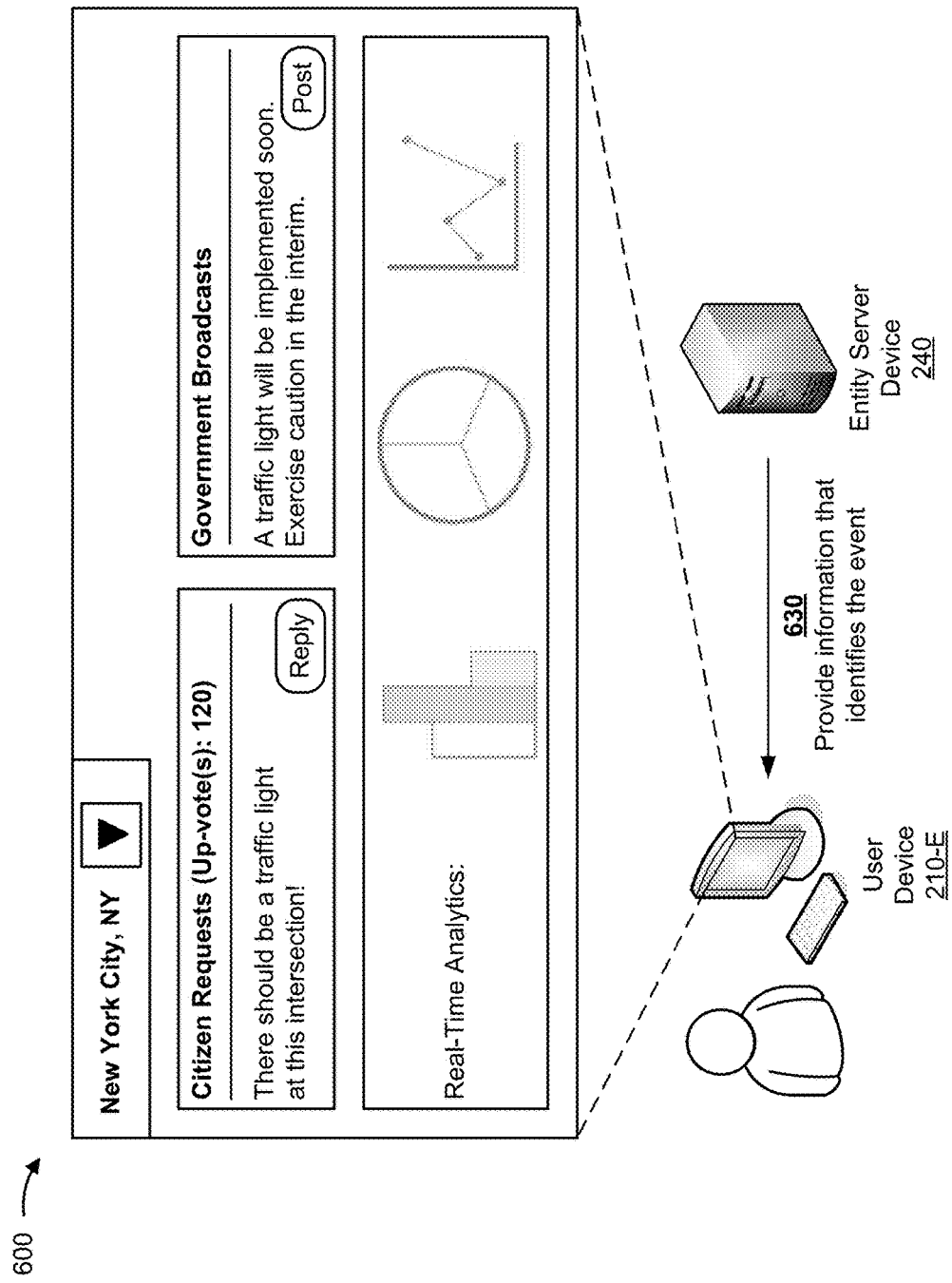

As shown in FIG. 6C, and as shown by reference number 630, entity server device 240 may provide, to user device 210-E, information that identifies the event. As shown, user device 210-E may provide, for display, information that identifies the event, information that identifies the user generated content, and/or response information. In this way, a user (e.g., a city official) of user device 210-E may view the particular information associated with the geolocation. For example, assume that the user of user device 210-E determines that the intersection associated with the user generated content poses a risk without the proposed traffic light. In this case, the user of user device 210-E may interact with user device 210-E to generate alert information (e.g., "A traffic light will be implemented soon. Exercise caution in the interim.").

Figure 6D:
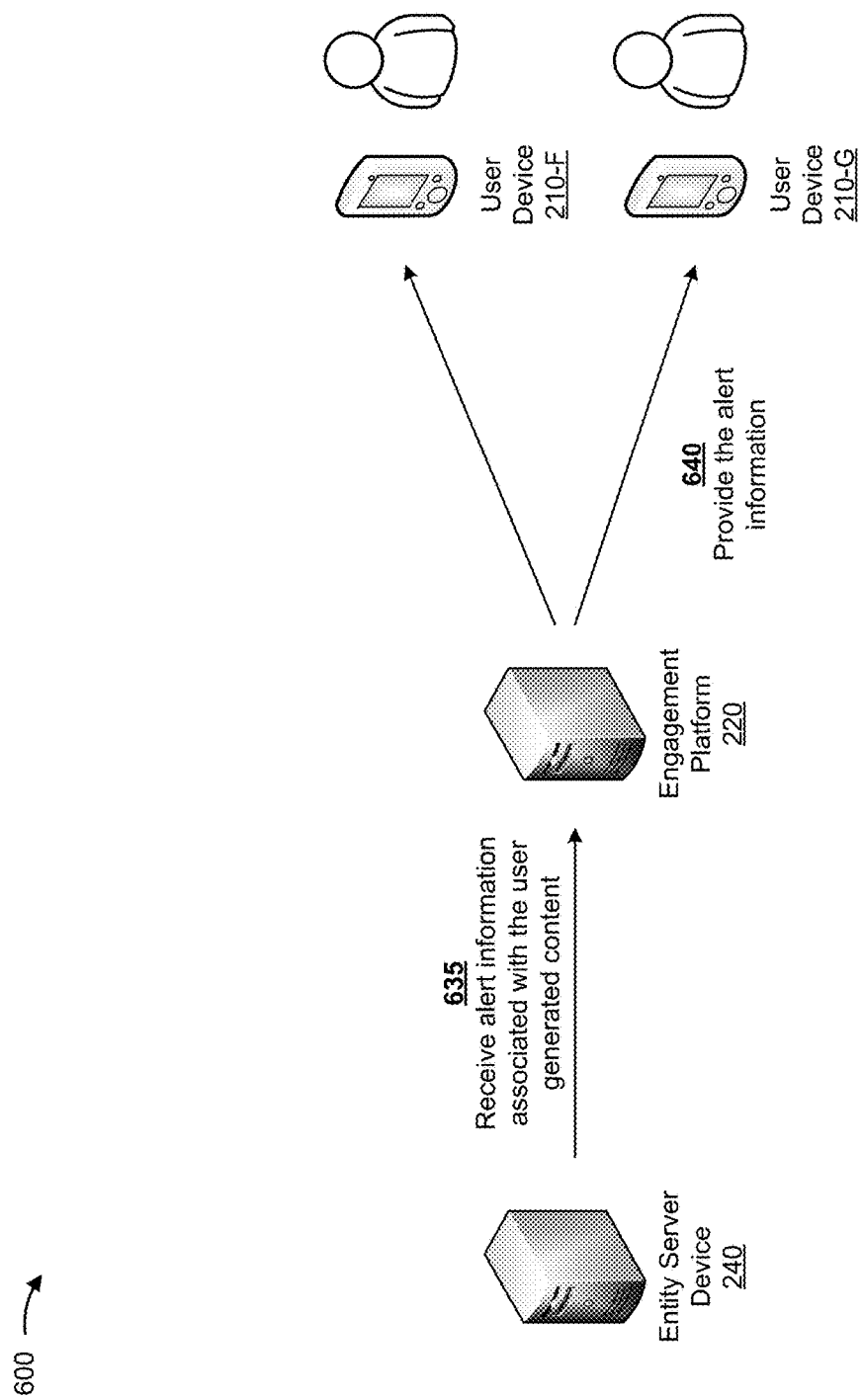

As shown in FIG. 6D, and by reference number 635, engagement platform 220 may receive, from entity server device 240, alert information associated with the user generated content. As shown by reference number 640, engagement platform 220 may provide, to user devices 210-F and 210-G, the alert information. For example, assume that user devices 210-F and 210-G are located within a threshold distance of the geolocation of the user generated content (e.g., are nearby the intersection).

As shown in FIG. 6E, user device 210-G may provide, for display, the alert information as an AR overlay. For example, as shown, user device 210-G may provide, for display, imagery associated with the geolocation and may provide the alert information as a superimposed AR overlay. In this way, user device 210-G may provide, for display, information that is pertinent to a geolocation of user device 210-G (e.g., as determined by users of other user devices 210 and/or a user associated with entity server device 240).

As indicated above, FIGS. 6A-6E are provided merely as an example. Other examples are possible and may differ from what was described with regard to FIGS. 6A-6E.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive, from a user device, information that identifies a geolocation of the user device;
determine a set of sensor devices that are associated with the geolocation,
the set of sensor devices being determined based on sensor scores associated with the set of sensor devices satisfying a threshold,
each sensor score, of the sensor scores, being associated with a particular sensor device, of the set of sensor devices, and being determined based upon an amount of user devices that are providing real-time feedback associated with the particular sensor device;
request, from the set of sensor devices, real-time information associated with the geolocation based on determining the set of sensor devices,
the real-time information being requested based on the sensor scores associated with the set of sensor devices satisfying the threshold;
receive, from the set of sensor devices, the real-time information associated with the geolocation based on requesting the real-time information; and provide, to the user device, the real-time information associated with the geolocation to permit the user device to provide, for display via a user interface, the real-time information as an augmented reality overlay.

2. The device of claim 1, where the one or more processors are further to:
receive, from the user device, information that identifies user generated content;
provide, to a set of other user devices, the information that identifies the user generated content;
receive, from the set of other user devices, response information based on providing the information that identifies the user generated content;
determine an event based on the information that identifies the user generated content and the response information; and
provide, to another device, information that identifies the event,
the other device being associated with an entity to perform a particular action in association with the geolocation based on the information that identifies the event.

3. The device of claim 1, where the one or more processors are further to:
receive, from the user device, information that identifies a sensor device, of the set of sensor devices, for which to receive the real-time information associated with the geolocation; and
where the one or more processors, when requesting the real-time information associated with the geolocation, are to:
request the real-time information based on the information that identifies the sensor device.

4. The device of claim 1, where the one or more processors are further to:
receive, from another device, information that identifies an event associated with the geolocation,
the other device being associated with an entity that is associated with the geolocation; and
provide, to the user device, the information that identifies the event to permit the user device to provide, for display, the information that identifies the event as another augmented reality overlay.

5. The device of claim 1, where the one or more processors are further to:
receive, from another device, information that identifies an event associated with the geolocation;
receive, from a sensor device of the set of sensor devices, information associated with the event; and
provide, to the user device, the information that identifies the event associated with the geolocation and the information associated with the event.

6. The device of claim 1, where the one or more processors are further to:
receive, from another user device, information that identifies user generated content associated with the geolocation; and
provide, to the user device, the information that identifies the user generated content to permit the user device to provide, for display, the information that identifies the user generated content as another augmented reality overlay.

7. The device of claim 1, where the one or more processors are further to:
receive information that identifies a geographic location of the user device;
receive information that identifies an orientation of the user device; and
where the one or more processors, when determining the set of sensor devices, are to:
determine the set of sensor devices based on the information that identifies the geographic location of the user device and the information that identifies the orientation of the user device.

8. A non-transitory computer-readable medium storing instructions, the instructions comprising:
one or more instructions that, when executed by one or more processors, cause the one or more processors to:
receive, from a user device, information that identifies a geolocation of the user device;
request, from a set of sensor devices that are associated with the geolocation, real-time information associated with the geolocation based on the information that identifies the geolocation,
the set of sensor devices being requested based on sensor scores associated with the set of sensor devices satisfying a threshold,
each sensor score, of the sensor scores, being associated with a particular sensor device, of the set of sensor devices, and being determined based upon an amount of user devices that are providing real-time feedback associated with the particular sensor device;
receive, from the set of sensor devices, the real-time information associated with the geolocation,
the real-time information being received based on the sensor scores associated with the set of sensor devices satisfying the threshold; and
provide, to the user device, the real-time information associated with the geolocation to permit the user device to provide, for display, the real-time information as an augmented reality overlay.

9. The non-transitory computer-readable medium of claim 8, where the one or more instructions, when executed by the one or more processors, further cause the one or more processors to:
receive, from the user device, information that identifies user generated content associated with the geolocation; and
provide, to another device, the information that identifies the user generated content,
the other device being associated with a government entity associated with the geolocation.

10. The non-transitory computer-readable medium of claim 8, where the one or more instructions, when executed by the one or more processors, further cause the one or more processors to:
receive, from another device, information that identifies an alert associated with the geolocation,
the other device being associated with a government agency; and
provide, to the user device, the information that identifies the alert to permit the user device to provide, for display, the information that identifies the alert as another augmented reality overlay.

11. The non-transitory computer-readable medium of claim 8, where the one or more instructions, when executed by the one or more processors, further cause the one or more processors to:
receive, from another device, information that identifies an event associated with the geolocation;
receive, from a sensor device of the set of sensor devices, information associated with the event; and provide, to the user device, the information that identifies the event associated with the geolocation and the information associated with the event.

12. The non-transitory computer-readable medium of claim 8, where the one or more instructions, when executed by the one or more processors, further cause the one or more processors to:
receive, from another user device, information that identifies user generated content associated with the geolocation; and
provide, to the user device, the information that identifies the user generated content to permit the user device to provide, for display, the information that identifies the user generated content as another augmented reality overlay.

13. The non-transitory computer-readable medium of claim 8, where the one or more instructions, when executed by the one or more processors, further cause the one or more processors to:
receive, from the user device, information that identifies a type of sensor device; and
where the one or more instructions, that cause the one or more processors to request the real-time information, cause the one or more processors to:
request the real-time information based on the type of sensor device.

14. A method, comprising:
receiving, by a device and from a user device, information that identifies a geolocation and an orientation of the user device;
determining, by the device, a set of sensor devices that are associated with the geolocation and the orientation,
the set of sensor devices being determined based on sensor scores associated with the set of sensor devices satisfying a threshold,
each sensor score, of the sensor scores, being associated with a particular sensor device, of the set of sensor devices, and being determined based upon an amount of user devices that are providing real-time feedback associated with the particular sensor device;
requesting, by the device and from the set of sensor devices, real-time information associated with the geolocation,
the real-time information being requested based on the sensor scores associated with the set of sensor devices satisfying the threshold;
receiving, by the device and from the set of sensor devices, the real-time information associated with the geolocation; and
providing, by the device and to the user device, the real-time information associated with the geolocation to permit the user device to provide, for display, the real-time information as an augmented reality overlay.

15. The method of claim 14, further comprising:
receiving, from the user device, information that identifies user generated content associated with the geolocation;
receiving, from a set of other user devices, information that identifies other user generated content associated with the geolocation;
determining an event based on the information that identifies the user generated content and the information that identifies the other user generated content; and
providing, to another device, information that identifies the event.

16. The method of claim 14, further comprising:
receiving, from another device, information that identifies an event associated with the geolocation,
the other device being associated with an organization associated with the geolocation; and
providing, to the user device, the information that identifies the event to permit the user device to provide, for display, the information that identifies the event as another augmented reality overlay.

17. The method of claim 14, further comprising:
receiving, from another device, information that identifies an event;
receiving, from a sensor device of the set of sensor devices, information associated with the event; and
providing, to the user device, the information associated with the event to permit the user device to provide, for display, the information associated with the event as another augmented reality overlay.

18. The method of claim 14, further comprising:
receiving, from another user device, information that identifies user generated content associated with the geolocation; and
providing, to the user device, the information that identifies the user generated content to permit the user device to provide, for display, the information that identifies the user generated content as another augmented reality overlay.

19. The method of claim 14, further comprising:
receiving, from a set of user devices, information associated with the geolocation,
the set of user devices including the user device;
determining that an amount of user devices, of the set of user devices, satisfies a threshold; and
providing, to another device, the information associated with the geolocation,
the other device being associated with a government entity that is associated with the geolocation.

20. The non-transitory computer-readable medium of claim 8, where the one or more instructions, when executed by the one or more processors, further cause the one or more processors to:
identify particular communication protocols for communicating with sensor devices associated with the set of sensor devices.

* * * * *